US010069907B2

(12) United States Patent
Tung et al.

(10) Patent No.: US 10,069,907 B2
(45) Date of Patent: *Sep. 4, 2018

(54) CONTROL LAYER FOR CLOUD COMPUTING ENVIRONMENTS

(71) Applicant: Accenture Global Services Limited, Dublin (IE)

(72) Inventors: Teresa S. Tung, San Jose, CA (US); Joseph F. Tobolski, Clarendon Hills, CA (US); Kishore S. Swaminathan, Willowbrook, IL (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/938,337

(22) Filed: Nov. 11, 2015

(65) Prior Publication Data

US 2016/0065664 A1 Mar. 3, 2016

Related U.S. Application Data

(63) Continuation of application No. 14/510,408, filed on Oct. 9, 2014, now Pat. No. 9,215,190, which is a
(Continued)

(51) Int. Cl.
*G06F 9/50* (2006.01)
*H04L 29/08* (2006.01)
(Continued)

(52) U.S. Cl.
CPC ........ *H04L 67/1012* (2013.01); *G06F 9/5027* (2013.01); *G06F 9/5072* (2013.01);
(Continued)

(58) Field of Classification Search
CPC .. G06F 9/45533; G06F 9/5027; G06F 9/5072; H04L 41/5003; H04L 41/5009
See application file for complete search history.

(56) References Cited

U.S. PATENT DOCUMENTS 6,725,378 B1 4/2004 Schuba
6,925,642 B1 8/2005 Commander
(Continued)

FOREIGN PATENT DOCUMENTS

WO WO 2010035281 A1 4/2010

OTHER PUBLICATIONS

Buyya, et al., "Market-Oriented Cloud Computing Vision, Hype and Reality for Delivering IT Services as Computing Utilities," High Performance Computing and Communications, Sep. 25, 2008, pp. 5-13, HPCC 08, 10th IEEE International Conference, Piscataway, New Jersey.
(Continued)

*Primary Examiner* — Jeong S Park
(74) *Attorney, Agent, or Firm* — Brinks Gilson & Lione

(57) ABSTRACT

A computing system implemented method, in one embodiment, can include a cloud control module receiving a constraint for cloud architecture. In addition, the method can include the cloud control module receiving a plurality of cloud service provider capabilities. Furthermore, the method can include the cloud control module filtering the plurality of cloud service provider capabilities to identify a cloud service provider capable of satisfying the constraint. Moreover, the method can include the cloud control module outputting an instruction for a resource from the cloud service provider.

20 Claims, 13 Drawing Sheets

Related U.S. Application Data continuation of application No. 13/071,442, filed on Mar. 24, 2011, now Pat. No. 8,886,806.

(60) Provisional application No. 61/321,761, filed on Apr. 7, 2010.

(51) Int. Cl.
*H04L 12/24* (2006.01)
*H04L 12/911* (2013.01)

(52) U.S. Cl.
CPC ...... *H04L 41/5003* (2013.01); *H04L 41/5019* (2013.01); *H04L 47/70* (2013.01); *H04L 67/1008* (2013.01); *H04L 67/34* (2013.01)

(56) References Cited

U.S. PATENT DOCUMENTS

| | | | |
|---|---|---|---|
| 6,963,828 B1 | 11/2005 | McDonald | |
| 7,249,176 B1 | 7/2007 | Salas et al. | |
| 7,376,693 B2 | 5/2008 | Neiman et al. | |
| 7,668,703 B1 | 2/2010 | Rolia | |
| 7,747,750 B1 | 6/2010 | Simon et al. | |
| 8,341,270 B2 | 12/2012 | Mazzaferri et al. | |
| 8,484,355 B1 | 7/2013 | Lochhead et al. | |
| 8,886,806 B2* | 11/2014 | Tung | G06F 9/5072 709/224 |
| 9,215,190 B2* | 12/2015 | Tung | G06F 9/5072 |
| 2003/0200300 A1 | 10/2003 | Melchione | |
| 2004/0006589 A1 | 1/2004 | Maconi et al. | |
| 2004/0111506 A1 | 6/2004 | Kundu | |
| 2005/0044220 A1 | 2/2005 | Madhavan | |
| 2005/0080838 A1 | 4/2005 | Colby et al. | |
| 2006/0153090 A1 | 7/2006 | Bishop | |
| 2007/0043860 A1 | 2/2007 | Pabari | |
| 2007/0300297 A1* | 12/2007 | Dawson | H04L 63/20 726/22 |
| 2008/0091806 A1 | 4/2008 | Shen | |
| 2008/0114624 A1 | 5/2008 | Kitts | |
| 2008/0163194 A1* | 7/2008 | Dias | G06F 8/60 717/174 |
| 2008/0244233 A1 | 10/2008 | Wilson | |
| 2008/0244579 A1 | 10/2008 | Muller | |
| 2008/0250267 A1 | 10/2008 | Brown | |
| 2008/0320482 A1* | 12/2008 | Dawson | G06F 9/5027 718/104 |
| 2009/0083390 A1 | 3/2009 | Abu-Ghazaleh et al. | |
| 2009/0300210 A1 | 12/2009 | Ferris | |
| 2009/0327495 A1 | 12/2009 | Betts-LaCroix et al. | |
| 2010/0042720 A1 | 2/2010 | Stienhans et al. | |
| 2010/0217864 A1 | 8/2010 | Ferris | |
| 2010/0306377 A1 | 12/2010 | DeHaan et al. | |
| 2010/0332617 A1 | 12/2010 | Goodwin et al. | |
| 2011/0016214 A1* | 1/2011 | Jackson | G06F 9/5044 709/226 |
| 2011/0087776 A1 | 4/2011 | Tabone et al. | |
| 2011/0087783 A1 | 4/2011 | Annapureddy et al. | |
| 2011/0119381 A1* | 5/2011 | Glover | G06F 9/5072 709/226 |
| 2011/0131306 A1 | 6/2011 | Ferris et al. | |
| 2011/0131329 A1* | 6/2011 | Kaplinger | G06F 9/5083 709/226 |
| 2011/0166952 A1* | 7/2011 | Manchikanti | G06Q 10/06 705/26.4 |
| 2011/0191838 A1 | 8/2011 | Yanagihara | |
| 2011/0202925 A1* | 8/2011 | Banerjee | G06F 9/5011 718/104 |
| 2011/0213875 A1* | 9/2011 | Ferris | G06F 9/5072 709/224 |
| 2011/0296021 A1 | 12/2011 | Dorai et al. | |
| 2012/0030356 A1 | 2/2012 | Fletcher | |
| 2012/0124211 A1 | 5/2012 | Kampas et al. | |
| 2014/0172782 A1 | 6/2014 | Schuenzel et al. | |

OTHER PUBLICATIONS

Prodan, et al., "A Survey and Taxonomy of Infrastructure as a Service and Web Hosting Cloud Providers," Oct. 13, 2008, pp. 17-25, 10th IEEE International Conference on Grid Computing, Piscataway, New Jersey.

Qian, et al., "Cloud Computing: An Overview," Jan. 1, 2009, pp. 626-631, Cloud Computing, vol. 5931, Springer-Verlag GmbH, Germany.

Vecchiola, et al., "Aneka: A Software Platform for .NET-based Cloud Computing," 2009, pp. 1-30, IOS Press, Fairfax, Virginia.

Tag Instances, https://elasticbox.com/documentation/managing-your-organization/resource-tags/, downloaded Jul. 20, 2015, pp. 1-8, ElasticBox, Inc., San Francisco, California.

Hector Fernandez, Surprised by your Cloud Bill every month? Try Cross-Cloud Tagging, Oct. 23, 2014, pp. 1-3, ElasticBox, Inc., San Francisco, California.

Cisco Prime Service Catalog 10.1 Adapter Integration Guide, Nov. 2014, pp. 1-364, Cisco Systems, Inc., San Jose, California.

Designing Integrations with Service Link Standard Adapters, Chapter 4, Cisco Prime Service Catalog 10.1 Adapter Integration Guide, Nov. 2014, pp. 1-72, Cisco Systems, Inc., San Jose, California.

* cited by examiner

CONTROL LAYER FOR CLOUD COMPUTING ENVIRONMENTS

PRIORITY CLAIM

This application is a continuation of U.S. application Ser. No. 14/510,408 filed Oct. 9, 2014, which is a continuation of U.S. application Ser. No. 13/071,442 filed Mar. 24, 2011 (now U.S. Pat. No. 8,886,806), which claims priority to provisional application Ser. No. 61/321,761, filed Apr. 7, 2010, all of which are entirely incorporated by reference.

BACKGROUND

Cloud computing is appealing to most enterprises because of its promise of commodity and on-demand utility computing. However, cloud computing faces key barriers to adoption. For example, key policy issue barriers can include legal, indemnity, and compliance. In addition, key technology issue barriers can involve security, reliability, and performance. Furthermore, what makes navigating these issues difficult is that cloud-based application architecture is confusing. First, the term "cloud" is overloaded and used by many vendors each with vastly differing offerings. Second, the on-demand and scalability features of cloud computing are new and architects are still working to understand how to leverage these capabilities.

SUMMARY

A computing system implemented method, in one embodiment, can include a cloud control module receiving a constraint for cloud architecture. In addition, the method can include the cloud control module receiving a plurality of cloud service provider capabilities. Furthermore, the method can include the cloud control module filtering the plurality of cloud service provider capabilities to identify a cloud service provider capable of satisfying the constraint. Moreover, the method can include the cloud control module outputting an instruction for a resource from the cloud service provider. Note that in various embodiments, the instruction for a resource can be implemented as, but is not limited to, a number of appliances to provision from the cloud service provider, a selection of a vendor provided platform from the cloud service provider, and/or a selection of a vendor provided software application from the cloud service provider.

While particular embodiments in accordance with the disclosure have been specifically described within this Summary, it is noted that the disclosure and the claimed subject matter are not limited in any way by these embodiments.

BRIEF DESCRIPTION OF THE DRAWINGS

The discussion below makes reference to [ ]. Within the accompanying drawings, various embodiments in accordance with the disclosure are illustrated by way of example and not by way of limitation. It is noted that like reference numerals denote similar elements throughout the drawings.

DETAILED DESCRIPTION

Reference will now be made in detail to various embodiments in accordance with the disclosure, examples of which are illustrated in the accompanying drawings. While the disclosure will be described in conjunction with various embodiments, it will be understood that these various embodiments are not intended to limit the disclosure. On the contrary, the disclosure is intended to cover alternatives, modifications and equivalents, which may be included within the scope of the disclosure. Furthermore, in the following detailed description of various embodiments in accordance with the disclosure, numerous specific details are set forth in order to provide a thorough understanding of the disclosure. However, it will be evident to one of ordinary skill in the art that the disclosure may be practiced without these specific details. In other instances, well known methods, procedures, components, and circuits have not been described in detail as not to unnecessarily obscure aspects of the disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities can take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It is noted that in one embodiment in accordance with the disclosure, a general description of "cloud" is a collection of network-hosted services accessible from almost anywhere with the following attributes: elastically scalable, illusion of infinite capacity, available on-demand, and consumption-based charges with no upfront commitment, but is not limited to such. This description can apply to all levels of the cloud (e.g., process, software application, compute platform, or virtual machine hosting).

Figure 1:
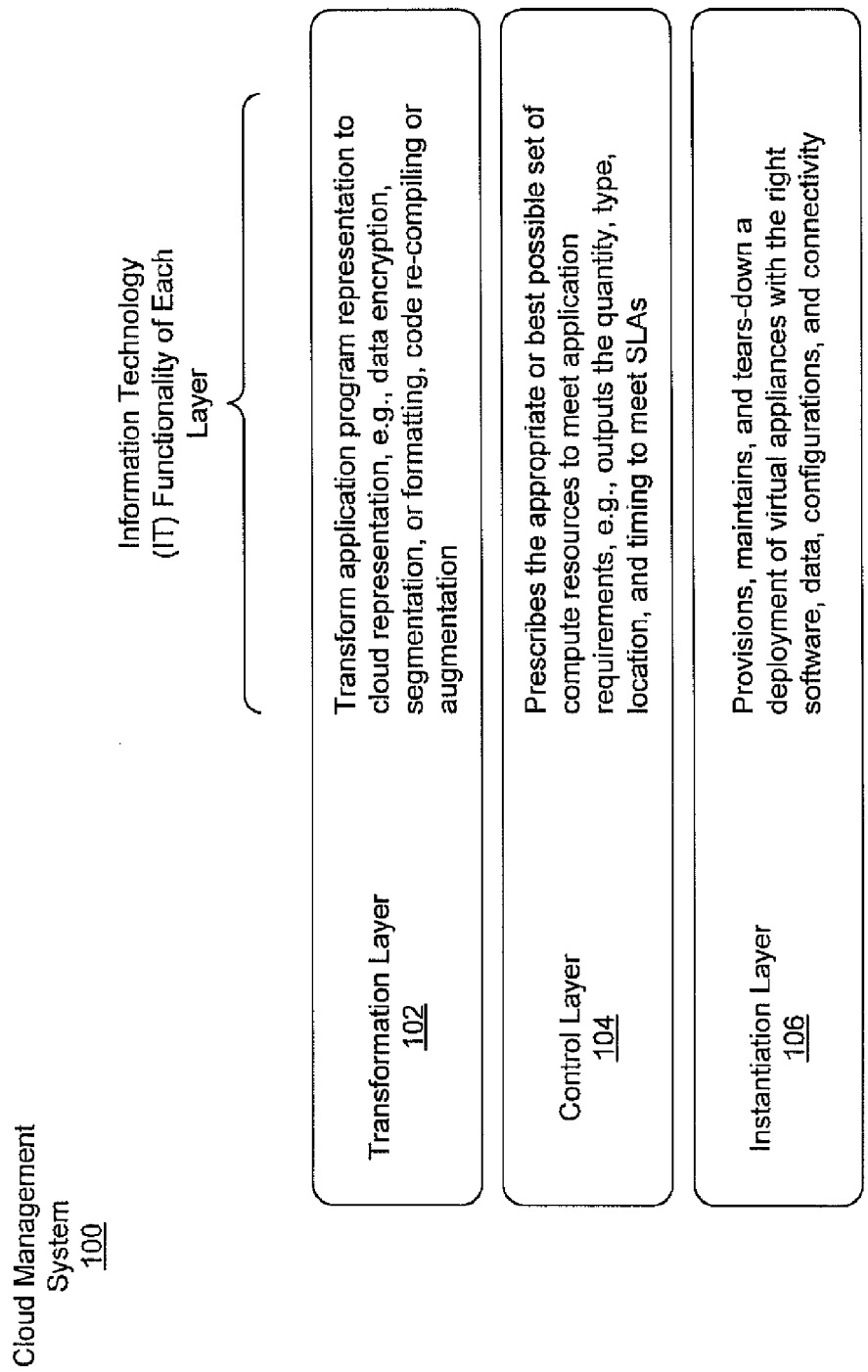
FIG. 1 is a cloud management system in accordance with various embodiments of the disclosure.

FIG. 1 is a cloud management system 100 in accordance with various embodiments of the disclosure. The cloud management system 100 can include, but is not limited to, a cloud transformation layer 102, a cloud control layer 104, and a cloud instantiation layer 106. Within the present embodiment, each layer can be a set of information technology (IT) functions that deliver conceptually similar services within part of the overall architecture. In one embodiment, the functions of each layer interface directly with those of adjacent layers. Within the cloud management system 100, details of other layers are decoupled and abstracted to separate concerns; each layer focuses on ensuring its set of services. Note that in one embodiment, the cloud transformation layer 102, the cloud control layer 104, and the cloud instantiation layer 106 can also be referred to as the cloud transformation module 102, the cloud control module 104, and the cloud instantiation module 106, respectively, but are not limited to such.

In various embodiments, one or more of the operations of the cloud management system 100 can be performed by software, by firmware, by hardware, or by any combination thereof, but is not limited to such. The cloud management system 100 can include processes of embodiments of the disclosure which can be carried out by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

Within FIG. 1, in one embodiment the cloud transformation layer 102 transforms user-generated application program and/or data representation into the cloud consumable representation. Example transformations can include, but are not limited to, data encryption, encoding for error correction, formatting, code recompiling, code augmentation with the cloud provider specific Application Programming Interface (API), segmenting large data objects into smaller units, reformatting data structures into XML (Extensible Markup Language), or applying business logic to structure data. Likewise example transformations applied to code can include, but are not limited to, recompiling, translating into a different language, or augmenting with additional code and/or cloud-provider specific API (e.g., replacing a general "get" or "put" statement requesting storage and retrieval with the API specific to the cloud service provider's storage service). The processing by the transformation layer 102 can complete the program for execution on the specific compute environment of the cloud.

Within FIG. 1, the cloud control layer 104 in an embodiment can prescribe the best possible or appropriate composition of an existing vendor provided platform and/or set of virtual machine appliances needed to form the desired compute platform. The control layer 104 can determine the quantity, type, and location of virtual appliances to create the desired compute platform. More than one-time provisioning, the control layer 104 can determine how and when to scale the compute platform to meet guarantees around service level agreements (SLAs), compliance, cost, and capability. Note that the control layer 104 can assign the formatted content from the transformation layer 102 across the prescribed deployment. The control layer 104 can ultimately determine how the cloud compute platform is fulfilled.

The cloud Instantiation Layer 106 in one embodiment can execute the specification output by the cloud control layer 104 (e.g., automation of scripts provision, maintain, and tear-down the prescribed deployment of virtual appliances). It is noted that as part of provisioning, the scripts can add the assigned content, software, data, configurations, and connectivity to form the application platform. For example in an embodiment, the cloud Instantiation Layer 106 can apply the Internet Protocol (IP) address and update the Domain Name System (DNS). Working with the Control Layer 104, the Instantiation Layer 106 can pass monitored statistics and then implement the updates when sourcing arrangements are recomputed. The Instantiation Layer 106 can also govern how provisioning and configuration occurs specific to the cloud-based service provider (e.g., data center, EC2, or GoGrid).

Within FIG. 1, the Control Layer 104 in an embodiment can determine the source, scale, and types of cloud and data center services needed in order to meet platform guarantees. As such, the Control Layer 104 can be dynamic and responsive to either changes in demand or conditions (e.g., it is able to respond to a longer than expected processing times or shortened turn around window).

Within an embodiment, the scaling algorithms or procedures of the cloud Control Layer 104 can be generic and independent of application or platform. In networking, the Transmission Control Protocol (TCP) can provide reliable end-to-end delivery of a packet stream regardless of the content being delivered or the network implementation. In a similar manner, the cloud Control Layer 104 algorithms or procedures can source and possibly scale the compute platform without knowledge of the content (e.g., the application program and data), or the details of the instantiation or implementation of the virtual machine appliances or vendor packaged platform. The sourcing algorithm or procedure works to prioritize preferred providers and filter out non-compliant providers that do not fulfill application requirements; then the scaling algorithm or procedure works to meet availability and performance objectives. The instantiation of the outputs prescribed by the Control Layer 104 are left to other orchestration mechanisms (e.g., provision and configure the virtual machine appliances).

Figure 2:
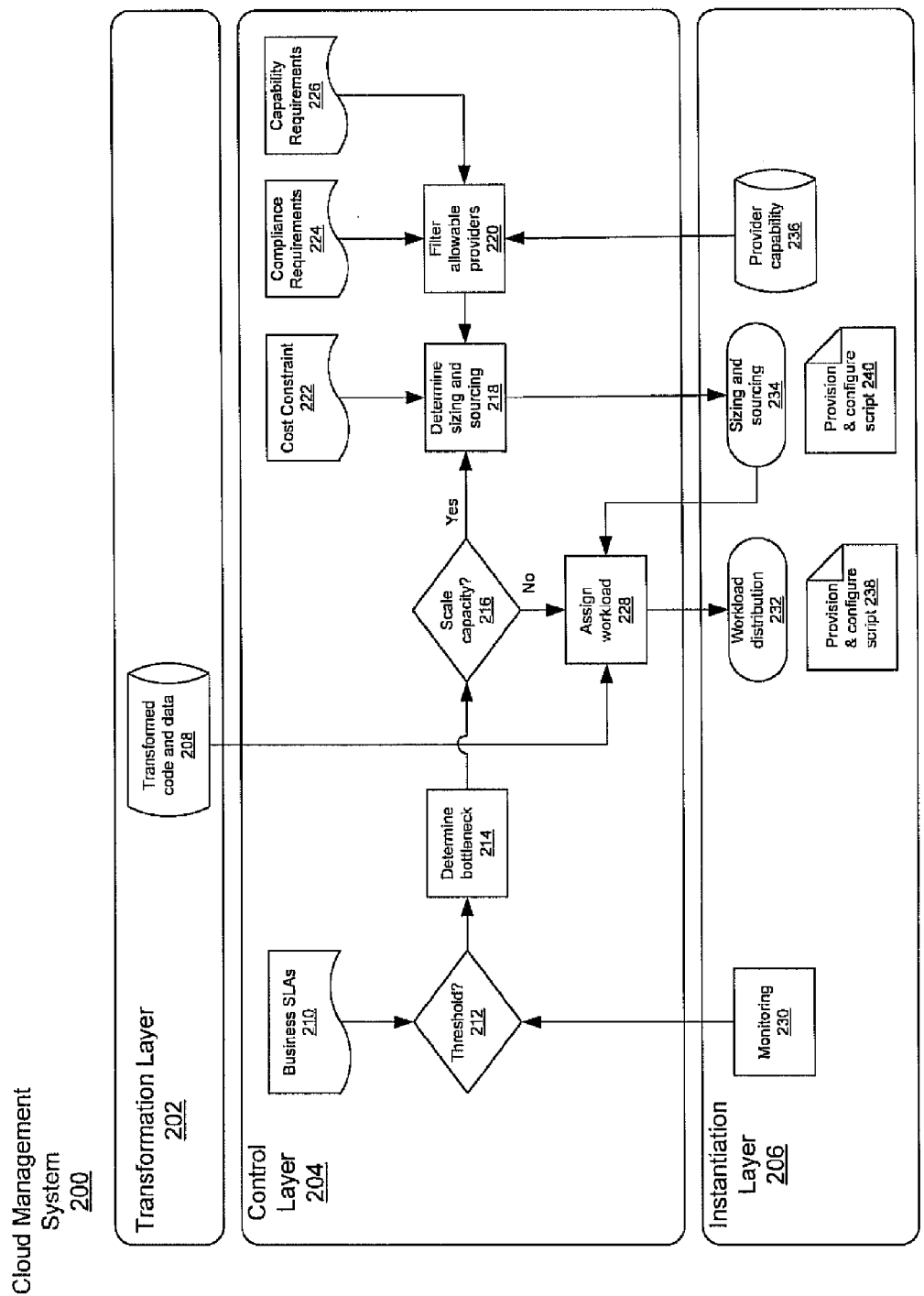
FIG. 2 illustrates example logic or functionality of a cloud management system in accordance with various embodiments of the disclosure.

FIG. 2 illustrates example logic or functionality of a cloud management system 200 in accordance with various embodiments of the disclosure. Specifically, FIG. 2 includes a flow diagram of example operations for a cloud Transformation Layer 202, a cloud Control Layer 204, and a cloud Instantiation Layer 206 in accordance with various embodiments of the disclosure. It is noted that in one embodiment, the example operations or functions of the cloud Transformation Layer 202, the cloud Control Layer 204, and the cloud Instantiation Layer 206 can be implemented as part of the cloud Transformation Layer 102, the cloud Control Layer 104, and the cloud Instantiation Layer 106, respectively, of FIG. 1, but are not limited to such.

In an embodiment, logic or functionality of the Cloud Control Layer 204 of the cloud management system 200 can consider various desired attributes like, but not limited to, performance, availability, desired cost, and compliance; and chooses the best set and number of resources based on the offered capability of providers or vendors with defined terms like, but not limited to, capability, average capacity, maximum capacity, start-up time, availability, published cost, and/or location. It is pointed out that a provider's values for these terms may be based on published metrics or values, or estimated from monitored and measured metrics collected over time, or collected measurements of the provider, or any combination thereof. Note that a provider's vector of values for performing a given capability is enough to summarize the application constraints for the Control Layer 204. Knowledge of the specific implementation within the virtual machine appliance or vendor packaged platform is not needed. In addition, note that when the capability is summarized, the algorithms (or functions or procedures) of the cloud Control Layer 204 do not deal directly with virtual machine appliance implementation.

Within FIG. 2, given the above application attributes and provider capability, the cloud Control Layer 204 can filter the providers or vendors by their ability to satisfy constraint and capability. From these preferred vendors, the logic of the cloud Control Layer 204 can determine scale and size to source from each vendor. This determination by the cloud Control Layer 204 can include the assignment of roles, e.g., primary and redundant, or worker and aggregator. The output of the cloud Control Layer 204 can be an instruction or instructions for one or more resources from the preferred vendors to the cloud Instantiation Layer 206. Note that in various embodiments, the instruction(s) for a resource(s) can be implemented as, but not limited to, a number and type of virtual machine appliances from each vendor for the cloud Instantiation Layer 206 to provision, a selection of a vendor provided platform from the cloud service provider, and/or a selection of a vendor provided software application from the cloud service provider. Therefore, the output of the cloud Control Layer 204 may prescribe a vendor package platform that serves the functionality, the details of building the platform, a vendor pre-bundled software application, and/or a number of virtual machine appliances that augment or replicate this functionality, but is not limited to such.

When determined to build a platform, the logic of the cloud Control Layer 204 can stipulate the scaling to meet performance and availability. For example in an embodiment, the cloud Control Layer 204 chooses a number of primary active nodes needed to meet performance constraints. Then, a number of additional redundant nodes needed to guarantee availability is determined by the cloud Control Layer 204. The Cloud Control Layer 204 can take these numbers along with a cost calculation that multiplies the number of resources and their cost thereby resulting in a system of equations or procedures for determining the required resources.

Or instead of or in addition to building a platform, the logic of the cloud Control Layer 204 can stipulate a vendor packaged platform to meet performance and availability. For example in an embodiment, the cloud Control Layer 204 compares the price of a vendor packaged cloud-based software application service that satisfies SLA constraints with that of a self-sourced version. Then the cloud Control Layer 204 can determine the vendor packaged platform, self-sourced platform, or any combination that minimizes costs needed to guarantee performance and availability.

Within FIG. 2, in one embodiment, controller logic of the Cloud Control Layer 204 can determine the number and location of the virtual appliances needed to service the compute prepared by the cloud Transformation Layer 202. Logic of the Cloud Control Layer 204 can filter the provided appliances and packaged platforms based on capability to serve and on constraints (e.g., remaining within the country or the data center). Then the logic of the Cloud Control Layer 204 selects the appropriate number and type of appliances or packaged platforms based on preferences and to meet desired guarantees. With the help of constant monitoring from the cloud Instantiation Layer 206, algorithms of the Cloud Control Layer 204 can assign the files to be processed, scale the number of virtual appliances, and re-assign files in case of delay or failure to meet time constraints. For example in an embodiment, if the processing is taking longer than expected, the logic of the Cloud Control Layer 204 signals that an additional virtual appliance is required. By implementing the logic at the Cloud Control Layer 204, there is control over the placement of the compute as well as the time constraint and availability.

Based on the determination of the Cloud Control Layer 204, the cloud Instantiation Layer 206 automates the appropriate scripts to provision the appliances or packaged platform, connect the resulting appliances or platforms, and tear-down appliances or platforms when finished. It is noted that in one embodiment, the cloud Instantiation Layer 206 can use a script that installs a pre-defined image of the appliances, but is not limited to such. Implementation of logic at the Cloud Control Layer 204 can determine the best possible or appropriate sourcing in terms of the quantity and placement of the appliances or packaged platforms and allows realization of custom attributes.

Within FIG. 2, the cloud Instantiation Layer 206 can provision and manage the deployment specified by the Cloud Control Layer 204. Functions at the cloud Instantiation Layer 206 can determine what configuration settings are applied. In an embodiment, the cloud Instantiation Layer 206 can use application programming interfaces (APIs) and scripts for each data center or cloud provider (or vendor) to set-up and configure the requested virtual machines or packaged platforms. The cloud Instantiation Layer 206 can also consolidate the monitoring across service providers (or vendors) that is passed back to the Cloud Control Layer 204. In one embodiment, for these actions, service automation products may be leveraged like Rightscale or Appistry, but is not limited to such. Note that changes in these actions (e.g., update Amazon credentials) can result in a change in the script used at the cloud Instantiation Layer 206 without impacting the Cloud Control Layer 204.

Within the cloud management system 200, in one embodiment, security presents different concerns at each of the Cloud Transformation Layer 202, the Cloud Control Layer 204, and the Cloud Instantiation Layer 206. For example, the Cloud Instantiation Layer 206 can apply network port configurations to minimize intrusion, can constantly monitor against compromise or network flooding, and can signal the Cloud Control Layer 204 for updates when adverse conditions are detected. In addition, the Cloud Transformation Layer 202 can provide encryption. As such, each layer adds a different level of protection.

Within FIG. 2, it is pointed out that in an embodiment, scripts of the Cloud Instantiation Layer 206 can check the health of provisioned machines and automatically re-provision in the case of failures. Or, in the case of vendor packaged platforms, the Instantiation Layer 206 checks on the health and automatically switches to a pre-determined back-up platform when needed. Logic of the Cloud Control Layer 204 can act on real-time monitoring to update the prescribed deployment with adequate backup capability. Additionally, the Cloud Transformation Layer 202 can apply error correction codes.

At operation 210 of the cloud management system 200, the cloud control layer 204 can receive business service level agreements (SLAs). It is noted that operation 210 can be implemented in a wide variety of ways. For example in one embodiment, the business service level agreements can be received by the cloud control layer 204 at operation 210 from a user interface of a computing device or system. In an embodiment, the business service level agreements can be read in at operation 210 from a file from the configuration management database. Note that operation 210 can be implemented in any manner similar to that described herein, but is not limited to such.

At operation 230 of FIG. 2, the cloud Instantiation Layer 206 can continuously monitor one or more service providers (or vendors) based on the received business service level agreements and then pass or send those monitored statistics to the cloud control layer 204. Note that operation 230 can be implemented in a wide variety of ways. For example, operation 230 can be implemented in any manner similar to that described herein, but is not limited to such.

At operation 212, the cloud control layer 204 can determine whether each of the monitored statistics of the service level agreements is satisfying their corresponding defined threshold. If each threshold is satisfied, no action is taken at operation 212 by the cloud control layer 204. However, if it is determined at operation 212 that one or more thresholds are not satisfied, the cloud control layer 204 can proceed to operation 214. It is pointed out that operation 212 can be implemented in a wide variety of ways. For example, operation 212 can be implemented in any manner similar to that described herein, but is not limited to such.

At operation 214 of FIG. 2, the cloud control layer 204 can determine the bottleneck (or obstacle) causing the one or more service level agreements to not satisfy their corresponding defined threshold. It is noted that operation 214 can be implemented in a wide variety of ways. For example in an embodiment, the determination at operation 214 can include analyzing the received monitored statistics to identify one or more virtual machine appliances and/or worker nodes that are causing the bottleneck, but is not limited to such. Operation 214 can be implemented in any manner similar to that described herein, but is not limited to such.

At operation 216, the cloud control layer 204 can determine whether scaling the compute platform capacity will potentially eliminate the one or more bottlenecks determined at operation 214. If so, the cloud control layer 204 can proceed to operation 218. However, if it is determined at operation 216 that scaling the compute platform capacity will not eliminate the one or more bottlenecks, the cloud control layer 204 can proceed to operation 228. Note that operation 216 can be implemented in a wide variety of ways. For example, operation 216 can be implemented in any manner similar to that described herein, but is not limited to such.

At operation 208 of FIG. 2, the cloud transformation layer 202 can receive and transform code and data, which are then transmitted by the cloud transformation layer 202 to the cloud control layer 204. It is pointed out that operation 208 can be implemented in a wide variety of ways. For example, operation 208 can be implemented in any manner similar to that described herein, but is not limited to such.

At operation 228 of FIG. 2, the cloud control layer 204 utilizes the transformed code and data together with sizing and sourcing information in order to assign workload across the prescribed deployment. In addition, the cloud control layer 204 can transmit at operation 228 the workload assignment information to the cloud instantiation layer 206. It is noted that operation 228 can be implemented in a wide variety of ways. For example, operation 228 can be implemented in any manner similar to that described herein, but is not limited to such.

At operation 232, after receiving the workload assignment information from the cloud control layer 204, the cloud instantiation layer 206 can distribute the workload across the prescribed deployment based on the workload assignment. Furthermore, as part of the workload distribution at operation 232, the cloud instantiation layer 206 can provision and configure script 238 in order to distribute the workload across the prescribed deployment based on the workload assignment. It is pointed out that operation 232 can be implemented in a wide variety of ways. For example, operation 232 can be implemented in any manner similar to that described herein, but is not limited to such.

At operation 222 of FIG. 2, the cloud control layer 204 can receive one or more cost constraints for service providers or vendors. It is noted that operation 222 can be implemented in a wide variety of ways. For example in one embodiment, the one or more cost constraints for service providers can be received by the cloud control layer 204 at operation 222 from a user interface of a computing device or system. Note that operation 222 can be implemented in any manner similar to that described herein, but is not limited to such.

At operation 224, the cloud control layer 204 can receive one or more compliance requirements for service providers or vendors. Note that operation 224 can be implemented in a wide variety of ways. For example in an embodiment, the one or more compliance requirements for service providers can be received by the cloud control layer 204 at operation 224 from a user interface of a computing device or system. It is pointed out that operation 224 can be implemented in any manner similar to that described herein, but is not limited to such.

At operation 226 of FIG. 2, the cloud control layer 204 can receive one or more capability requirements for service providers or vendors. Note that operation 224 can be implemented in a wide variety of ways. For example in one embodiment, the one or more capability requirements for service providers can be received by the cloud control layer 204 at operation 226 from a user interface of a computing device or system. It is noted that operation 226 can be implemented in any manner similar to that described herein, but is not limited to such.

At operation 236, the cloud instantiation layer 206 can acquire and transmit capability information for one or more service providers to the cloud control layer 204. It is pointed out that operation 236 can be implemented in a wide variety of ways. For example, operation 236 can be implemented in any manner similar to that described herein, but is not limited to such.

At operation 220 of FIG. 2, the cloud control layer 204 can utilize the received compliance requirements for service providers, the received capability requirements for service providers, and the received capability information for one or more service providers in order to filter out allowable service providers that are able to satisfy the requirements. R is noted that operation 220 can be implemented in a wide variety of ways. For example, operation 220 can be implemented in any manner similar to that described herein, but is not limited to such.

At operation 218, in order to scale the compute platform capacity to potentially eliminate the one or more bottlenecks determined at operation 214, the cloud control layer 204 can utilize the received one or more cost constraints and the allowable service providers to determine sizing and sourcing from each service provider or vendor. Additionally, the cloud control layer 204 can transmit or output at operation 218 sizing and sourcing information to the cloud instantiation layer 206. It is pointed out that operation 218 can be implemented in a wide variety of ways. For example in one embodiment, the sizing and sourcing determination at operation 218 by the cloud control layer 204 can include the assignment of roles (e.g., primary and redundant, or worker and aggregator), but is not limited to such. In addition, the output of the cloud control layer 204 at operation 218 can be a number and type of virtual machine appliances from each vendor for the cloud instantiation layer 206 to provision, but is not limited to such. Furthermore, the output of the cloud control layer 204 at operation 218 may prescribe a vendor provided platform that serves the basic functionality, or the details of building the platform, or a number of virtual machine appliances that augment or replicate this basic functionality. Operation 218 can be implemented in any manner similar to that described herein, but is not limited to such.

At operation 234 of FIG. 2, after receiving the sizing and sourcing information from the cloud control layer 204, the cloud instantiation layer 206 can provision and configure script 240 in order to implement the sizing and sourcing from each service provider or vendor. Moreover, the cloud instantiation layer 206 at operation 234 can also output or transmit the received sizing and sourcing information to the cloud control layer 204 for use at operation 228. Note that operation 234 can be implemented in a wide variety of ways. For example, operation 234 can be implemented in any manner similar to that described herein, but is not limited to such.

Below is described the formulation by the Cloud Control Layer 204 for scaling virtual appliances to meet performance and availability. For example in an embodiment, first a number is chosen of primary active nodes needed to meet performance constraints. Then a determination is made of the number of additional redundant nodes needed to guarantee availability. Taking these numbers along with a cost calculation that multiplies the number of resources and their cost; the result is a system of equations for the Cloud Control Layer 204 to determine the required resources.

In one embodiment, a determination is first made by the Cloud Control Layer 204 of the number of primary nodes needed to meet performance constraints. At the highest level, the Cloud Control Layer 204 can in an embodiment consider a virtual machine appliance or when horizontally scalable a group of virtual machine appliances each fulfilling different roles (e.g., load-balancer and worker node). Note that the functionality of each role is not interchangeable so the composite performance is based on the performance of each role. For example, the bottleneck can be the minimum capacity between the roles. Note that if there is a vendor packaged platform already in existence, it can be considered on its own by the Cloud Control Layer 204. For example, the Cloud Control Layer 204 can consider the maximum capacity it can receive from that vendor packaged platform. It is noted that the vendor capacity can then be augmented by other vendors or from a sourcing of virtual appliances.

In an embodiment, the focus can be on the determination of each role separately. In the case where the appliance does not horizontally scale, then the number of nodes can be fixed by the Cloud Control Layer 204. For example, if the load balancer appliance does not scale, there can be one active node.

In one embodiment, one case is horizontally scalable where appliances perform the same functionality in parallel. Generally this case is additive in capacity by increasing the number of primary nodes N, the capacity increases linearly with N. The performance constraint varies based on the type of workload: events, sessions, or batch items (which are considered below). The number of active primary worker nodes N can be scaled by the Cloud Control Layer 204 to meet performance constraints. For example, if a maximum or average capacity is associated per node, a scheme (or technique) scales N so that the sum of the maximum or average capacity of the N nodes is bounded by some number. Another scheme (or technique) by the Cloud Control Layer 204 is described below in which the probability that the capacity of N nodes not being able to fulfill demand.

Within FIG. 2, in an embodiment event-based appliances replicate code so that all worker nodes offer the same service. The events to be processed can arrive within the same queue and then are load-balanced across N worker nodes. The number of workers N can be determined by the Cloud Control Layer 204 to provide the desired performance.

In one embodiment the cloud control layer 204 can let T be the time to process one event. Guarantees around T determine the performance of event-based systems. For example, find the smallest N so that the probability of exceeding delay threshold $T_{threshold}$ is bounded by P, in notation that is:

$$Pr(T \geq T_{threshold}) \leq P.$$

This system can be modeled by the cloud control layer 204 as an M/M/N queue with arrival rate $\lambda$, where arrivals experience exponential service time $\mu$, and are served by N similar and independent servers. The cloud Instantiation Layer 206 can provide estimates of these parameters by monitoring the average inter-arrival time of events ($1/\lambda$) and the average time for a unit to be processed ($1/\mu$).

In addition within FIG. 2, the cloud control layer 204 can let W(t) denote cumulative distribution function (CDF) of the waiting time in the system that includes time in the queue and the service time. This CDF gives:

$$Pr(T \geq T_{threshold}) = 1 - W(T_{threshold}).$$

In one embodiment, the cloud control layer 204 can select $N = \min\{n : W(T_{threshold}) \geq 1-P\}$, the smallest non-negative integer N that meets the constraint.

It is noted that in an embodiment, session-based appliances load-balance worker nodes by sessions. Each appliance has a known capacity C number of sessions. In one embodiment, the cloud control layer 204 can provision N so that at any time the available system capacity NC is greater than the number of desired active sessions, N is chosen to bound the probability of session blocking to be less than P.

Within FIG. 2, the desired number of sessions can be modeled by the cloud control layer 204 as an M/M/∞ queue wherein sessions arrive with exponential rate $\lambda$, depart at an exponential rate $\mu$. In one embodiment, the cloud control layer 204 can assume that $\lambda$ and $\mu$ vary slowly enough for the cloud Instantiation Layer 206 to estimate. The cloud control layer 204 can let $X_t$ be the number of session requests at time t.

Note that in an embodiment the cloud control layer 204 can suppose N is periodically chosen with period $T > T_{start}$ the start-up time of a new machine. At the start of the period time 0, $X_0 = n$. Then N can be updated so that for the hitting time:

$$T(NC) = \min\{t > 0: X_t = NC\}, \ Pr(T(NC) < T | X_0 = n) \leq P.$$

In an embodiment, the cloud control layer 204 can assume in batch jobs that the items to be processed are already collected as part of a separate process. In addition, the worker nodes can process their items in parallel and present a summarized result for aggregation.

In one embodiment of FIG. 2, the cloud control layer 204 can let T be the time to process all items. Furthermore, the number of worker nodes N can be evaluated to meet some bound T on the time to complete. For example in an embodiment, the cloud control layer 204 can re-evaluate N continuously to guarantee that the probability the batch is completed within the allotted time.

The cloud control layer 204 can assume in an embodiment the work is evenly partitioned so that with N worker nodes and a total workload W items that each node processes about $k = \lceil W/N \rceil$ jobs. It is noted that for a given worker, the time to process k events is $X = X_1 + \ldots + X_k$ for the cloud control layer 204 where the sequence $X_i$ is the time to process items i is independent and identically (or similarly) distributed with mean d and variance $\sigma^2$. Then for one worker the probability that it finishes in T is approximately:

$$\rho = 1 - Q\left(\frac{T - kd}{\sigma \sqrt{k}}\right)$$

where Q(.) is the cumulative distribution function (CDF) of the standard normal (Central Limit Theorem). Since each worker node has independent operations, the cloud control layer 204 can choose $N = \{\min k \geq 0: \rho^k \geq P\}$ so that the probability the batch job completes on time is large.

In one embodiment, given the primary nodes N, the number and sourcing of redundant nodes can be determined by the cloud control layer 204 that are needed to meet availability guarantees. Note that in an embodiment the cloud control layer 204 can be given the appliance and provider availability. As such, the cloud control layer 204 can let $q_i$ denote the availability of an appliance of type i. Furthermore, $q_i$ can be independent across providers. The cloud control layer 204 can let $P_j$ denote the availability of provider j. Note that $P_j$ can account for the availability of the network and of the provider so that appliances located in the same data center region are dependent and subject to the same availability (e.g., EC2 regions). It is noted that resources across regions can be independent. It is pointed out that like performance described above, the availability of a vendor package platform can be considered on its own by the cloud control layer 204. Or the vendor package platform can be considered by the cloud control layer 204 as a companion with other vendors or from the platform derived from a self-sourced collection of virtual appliances.

Within an embodiment, two cases can be considered by the cloud control layer 204. The first case deals with appliances serving the same function. Then the desired redundancy can be obtained by the cloud control layer 204 by limiting the maximum number of failures from a set of indistinct components. Otherwise, the second case deals with appliances that serve distinct functions and the composite availability is the product of the availability of each of the components. A nested formulation can be generated of these compositions by the cloud control layer 204 by conditioning on the availability of the providers.

Figure 3:
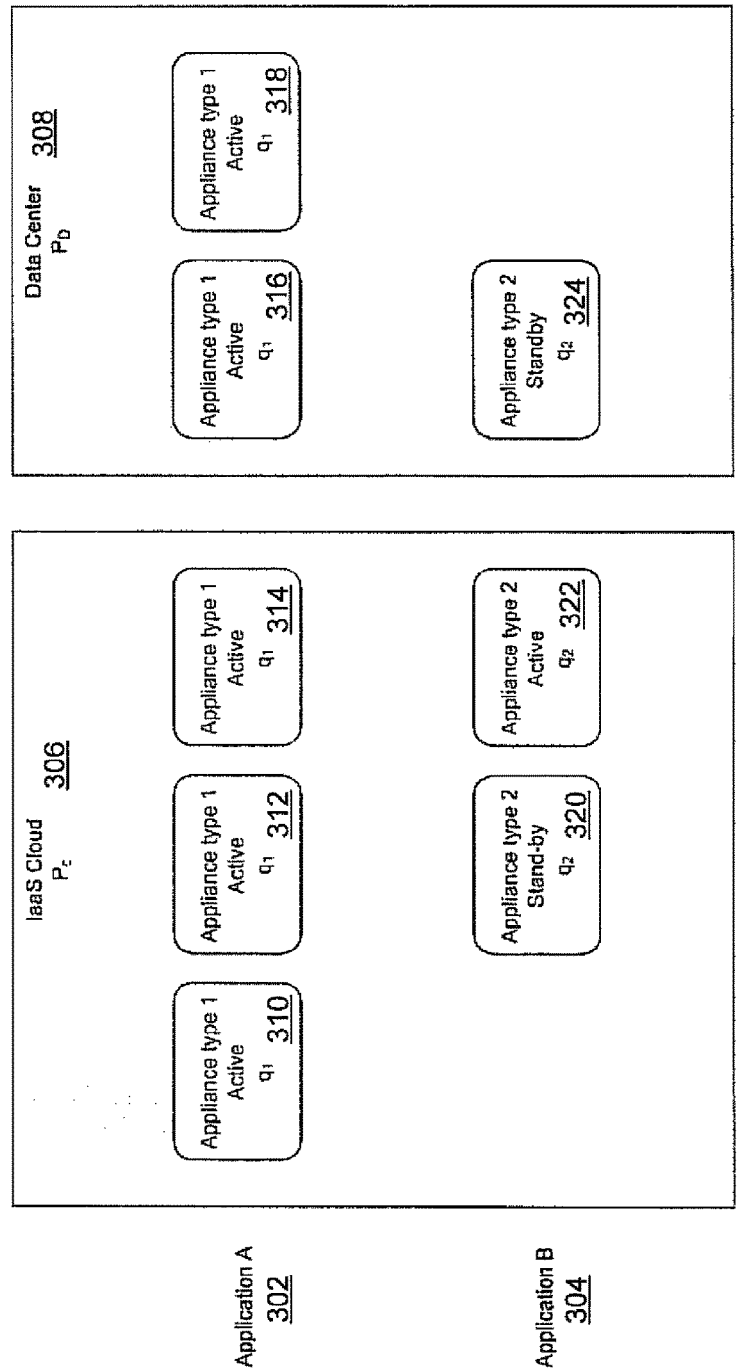
FIG. 3 is an example deployment in accordance with various embodiments of the disclosure.

FIG. 3 is an example deployment 300 in accordance with various embodiments of the disclosure. Specifically, application A 302 can be a worker that works or operates in parallel. Note that while all nodes may be active to maximize performance, the cloud control layer 204 can establish that $N_A = 2$ for capacity constraints. In addition, application B 304 can be an aggregator and does not scale so there is $N_B = 1$ active and the others are standby. It is pointed out that the deployment 300 is across two providers.

More specifically, the application A 302 can be deployed with three appliances (e.g., 310, 312, and 314) on cloud 306 and two appliances (e.g., 316 and 318) in data center 308, and the application B 304 has two appliances (e.g., 320 and 322) on the cloud 306 and one appliance (e.g., 324) in the data center 308. It is noted that each of appliances 310, 312, 314, 316, and 318 is an appliance of type 1 that is active (which has an availability of $q_1$). Moreover, each of appliances 320 and 324 is an appliance of type 2 that is stand-by (which has an availability of $q_2$) while appliance 322 is an appliance of type 2 that is active (which has an availability of $q_2$).

Within FIG. 3, the providers (e.g., 306 and 308) can be conditioned on by the cloud control layer 204 so that the number of appliances m is known. Then the number of failures is a Binomial Distribution with parameters m and $1 - q_i$. The cloud control layer 204 can let $F_{m,i}(x)$ be the CDF for this Binomial. Within the present embodiment, each appliance in an application can be interchangeable so the availability of the application A 302 can be determined by the cloud control layer 204 using:

$$F_{5,A}(3)P_C P_D + F_{3,A}(1)P_C(1-P_D) + F_{2,A}(0)(1-P_C)P_D.$$

Similarly the availability of the application B 304 can be determined by the cloud control layer 204 using:

$$F_{3,B}(2)P_C P_D + F_{2,B}(2)P_C(1-P_D) + F_{1,B}(0)(1-P_C)P_D.$$

Since the applications A 302 and B 304 are distinct, the availability of the Composite Application A and B can be determined by the cloud control layer 204 using:

$$F_{5,A}(3)F_{3,B}(2)P_C P_D + F_{3,A}(1)F_{2,B}(2)P_C(1-P_D)F_{2,A}(0)$$
$$F_{1,B}(0)(1-P_C)P_D.$$

It is noted that the automated algorithms of the cloud control layer 204 can leverage cloud's scalability to create a platform that meets user-defined reliability objectives. Note that the separation of concerns allows the cloud control layer 204 to remain generic. Scaling algorithms may be reused by the cloud control layer 204 for applications and platforms based on, but not limited to, specified application requirements, published or estimated provider values, and broad categorizations along with handling of events, sessions, or batch.

In an embodiment, cloud can be on-demand, elastic, and pay-per-use. Note that in one embodiment, the cloud control layer 204 sources a combination of basic external and internal computing satisfying this cloud definition to meet custom service level agreements (SLAs). Therefore, for one-time provisioning and for real-time use, the cloud control layer 204 can leverage cloud's dynamics to address reliability concerns.

Figure 4:
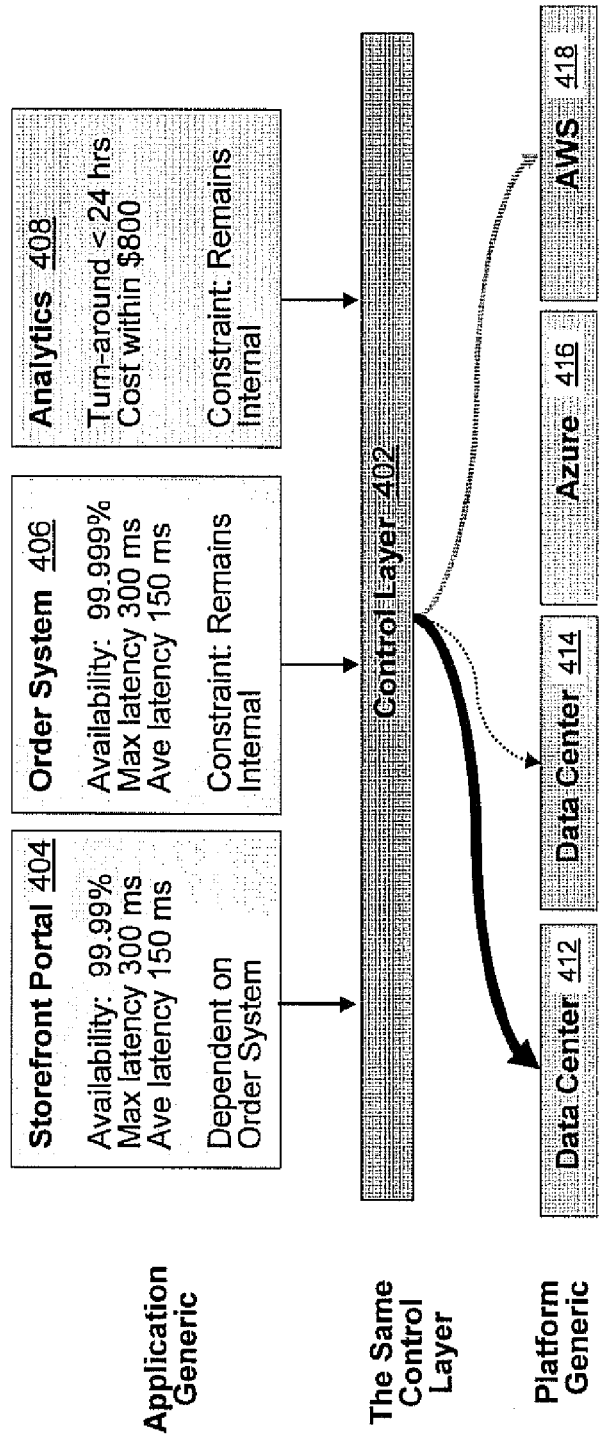
FIG. 4 illustrates an example of creating custom services on top of commodity cloud and data center offerings in accordance with various embodiments of the disclosure.

FIG. 4 illustrates an example of creating custom services on top of commodity cloud and data center offerings in accordance with various embodiments of the disclosure. In this manner, a company or organization can guarantee application service level agreements (SLAs) above cloud providers or vendors. In one embodiment, a generic cloud control layer 402 can compose less commodity cloud and data center resources. For example in an embodiment, the cloud control layer 402 can scale, size, and source the cloud providers or vendors, as described herein. In addition, the cloud control layer 402 can assign workload to the cloud providers or vendors, as described herein. Moreover, the cloud control layer 402 can receive monitoring and can repeat the above operations, as described herein.

Specifically, FIG. 4 illustrates different embodiments wherein the cloud control layer 402 can be application generic regarding, but not limited to, a storefront portal 404 (which can be dependent on order system), an order system 406 (wherein the constraint can remain internal), and analytics 408 (wherein the constraint can remain internal). It is pointed out that the same cloud control layer 402 can be implemented for each of the different applications 404, 406, and 408. In addition, the cloud control layer 402 can be platform generic.

It is noted that the present embodiment illustrates that the cloud control layer 402 can be application generic since it operates in a similar manner while handling different cloud applications. For example, the storefront portal application 404, the order system application 406, and the analytics application 408 can each involve different performance criteria or requirements from the cloud control layer 402. For example in one embodiment, the storefront portal application 404 can include, but is not limited to, an access availability of 99.99%, a maximum latency of 300 milliseconds (ms), and an average latency of 150 ms, which can all be dependent on an order system. Furthermore, the order system application 406 can include, but is not limited to, an access availability of 99.999%, a maximum latency of 300 ms, and an average latency of 150 ms, herein a constraint is that things remain internal. In addition, the analytics application 408 can include, but is not limited to, a turn-around of less than 24 hours (hr) and a cost within $800, wherein a constraint is that things remain internal. Given the differences of the storefront portal application 404, the order system application 406, and the analytics application 408, it is pointed out that the cloud control layer 402 can operate in a similar manner while handling these different cloud applications.

Within FIG. 4, it is noted that within the present embodiment the cloud control layer 402 can be platform generic. Specifically, the logic and/or functionality of the cloud control layer 402 remains unchanged while it manages as one or more different cloud platforms. For example in one embodiment, the cloud control layer 402 can operate in combination with, but is not limited to, a data center 412, a data center 414, a Windows Azure platform 416, and AWS (Amazon Web Services) platform 418, wherein each can involve different type of platform.

Figure 5:
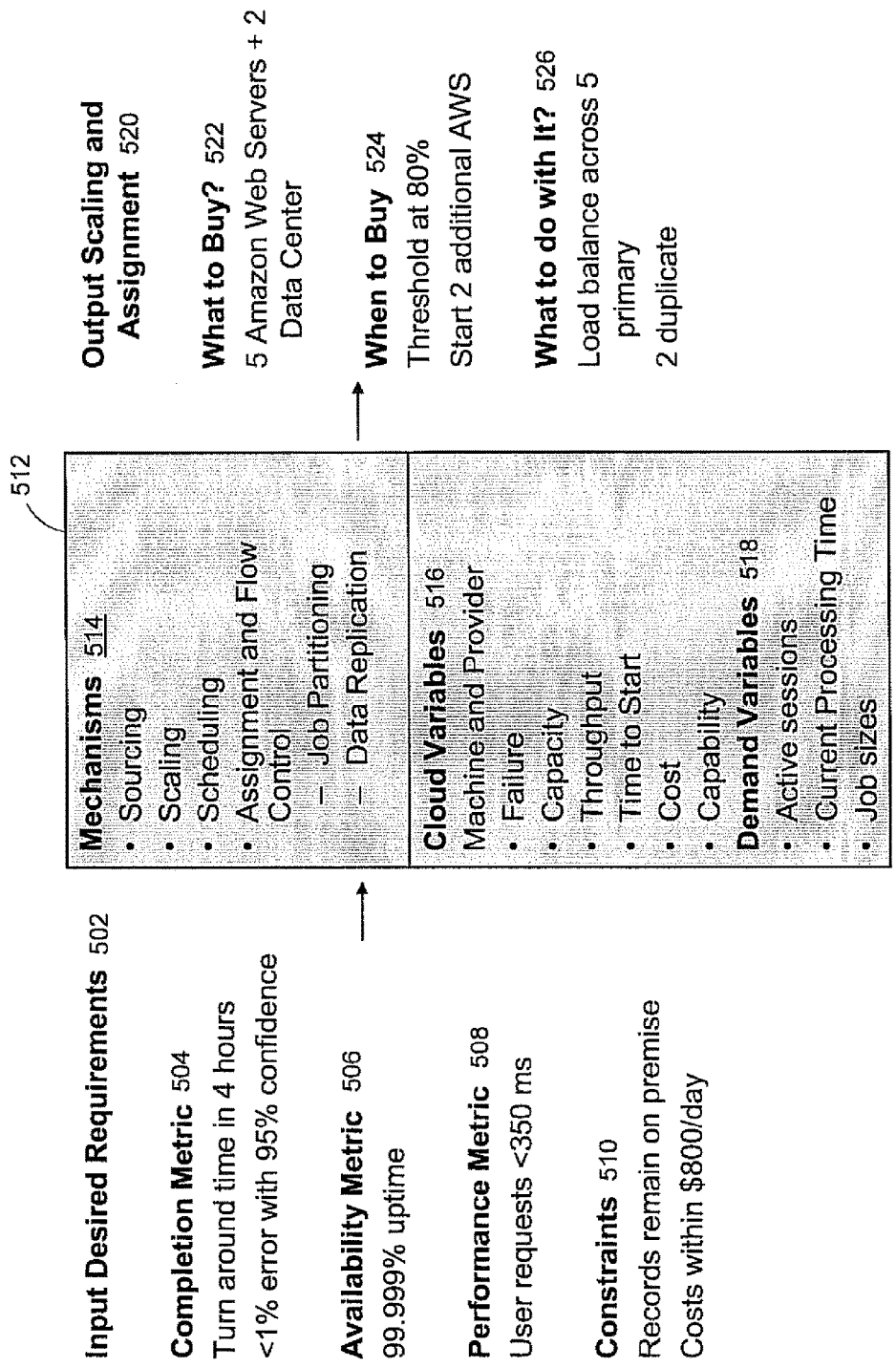
FIG. 5 illustrates an example of how to fulfill client requirements at a cloud control layer using less reliable data center and external cloud parts in accordance with various embodiments of the disclosure.

FIG. 5 illustrates an example of how to fulfill client requirements at a cloud control layer 512 using less reliable data center and external cloud parts in accordance with various embodiments of the disclosure. For example in one embodiment, one or more desired cloud requirements 502 can be input (e.g., via a user interface or a configuration file) or received by the cloud control layer 512. Note that the desired input cloud requirements 502 can be defined by a user and/or a client, but is not limited to such. The one or more desired input cloud requirements 502 can include a wide variety of metrics and/or constraints. For example within the present embodiment, the one or more desired input cloud requirements 502 can include, but are not limited to, one or more completion metrics 504, an availability metric 506, a performance metric 508, and one or more constraints 510.

More specifically, within the present embodiment the one or more completion metrics 504 can include, but are not limited to, a turnaround time in 4 hours and a less than 1% error with 95% confidence. In addition, the availability metric 506 can include, but is not limited to, a 99.999% uptime while the performance metric 508 can include, but is not limited to, user requests responded to in less than 350 ms. Furthermore, the one or more constraints 510 can include, but is not limited to, records remain on premise and costs within $800 per day.

Within FIG. 5, the cloud control layer 512 can include one or more mechanisms or functions 514. Moreover, the cloud control layer 512 can receive one or more cloud variables 516 and one or more demand variables 518. It is pointed out that the one or more mechanisms or functions 514 of the cloud control layer 512 can include a wide variety of mechanisms or functions. For example in the present embodiment, the mechanisms 514 of the cloud control layer 512 include, but are not limited to, sourcing, scaling, scheduling, along with assignment and flow control (which can include job partitioning and data replication) of cloud and data center service needed in order to meet the desired input requirements 502. Note that the mechanisms or functions 514 allow the cloud control layer 512 to be dynamic and responsive to changes in demand or conditions (e.g., able to respond to a longer than expected processing times or shortened turn around window).

In one embodiment, it is pointed out that the mechanisms or functions 514 of the cloud control layer 512 can be based on the received cloud variables 516 and the received demand variables 518. As such, the received cloud variables 516 and the received demand variables 518 can be taken into consideration by the mechanisms or functions 514 of the cloud control layer 512. The one or more cloud variables 516 can include, but are not limited to, machine and provider elements or variables such as, but not limited to, failure, capacity, throughput, time to start, cost, and capability. Additionally, the one or more demand variables 518 can include, but are not limited to, active sessions, current processing time, and job sizes.

Within FIG. 5, the cloud control layer 512 can output (e.g., to the cloud instantiation layer 106) one or more scaling and assignments 520. The one or more scaling and assignments 520 can include a wide variety of information and/or instructions. For example within the present embodiment, the one or more scaling and assignments 520 can include, but are not limited to, what to buy 522, when to buy 524, and what to do with it 526.

More specifically, within the present embodiment the what to buy 522 can include, but are not limited to, buying five Amazon Web Servers plus two data centers. Additionally, the when to buy 524 can include, but is not limited to, once the threshold is at 80%, start two additional Amazon Web Servers. Moreover, the what to do with it 526 can include, but is not limited to, bad balance across five primary nodes and duplicate two. It is understood that the what to buy 522, the when to buy 524, and the what to do with it 526 can be implemented with any number and/or values of elements and are not limited in any way to those shown in the present embodiment.

Figure 6:
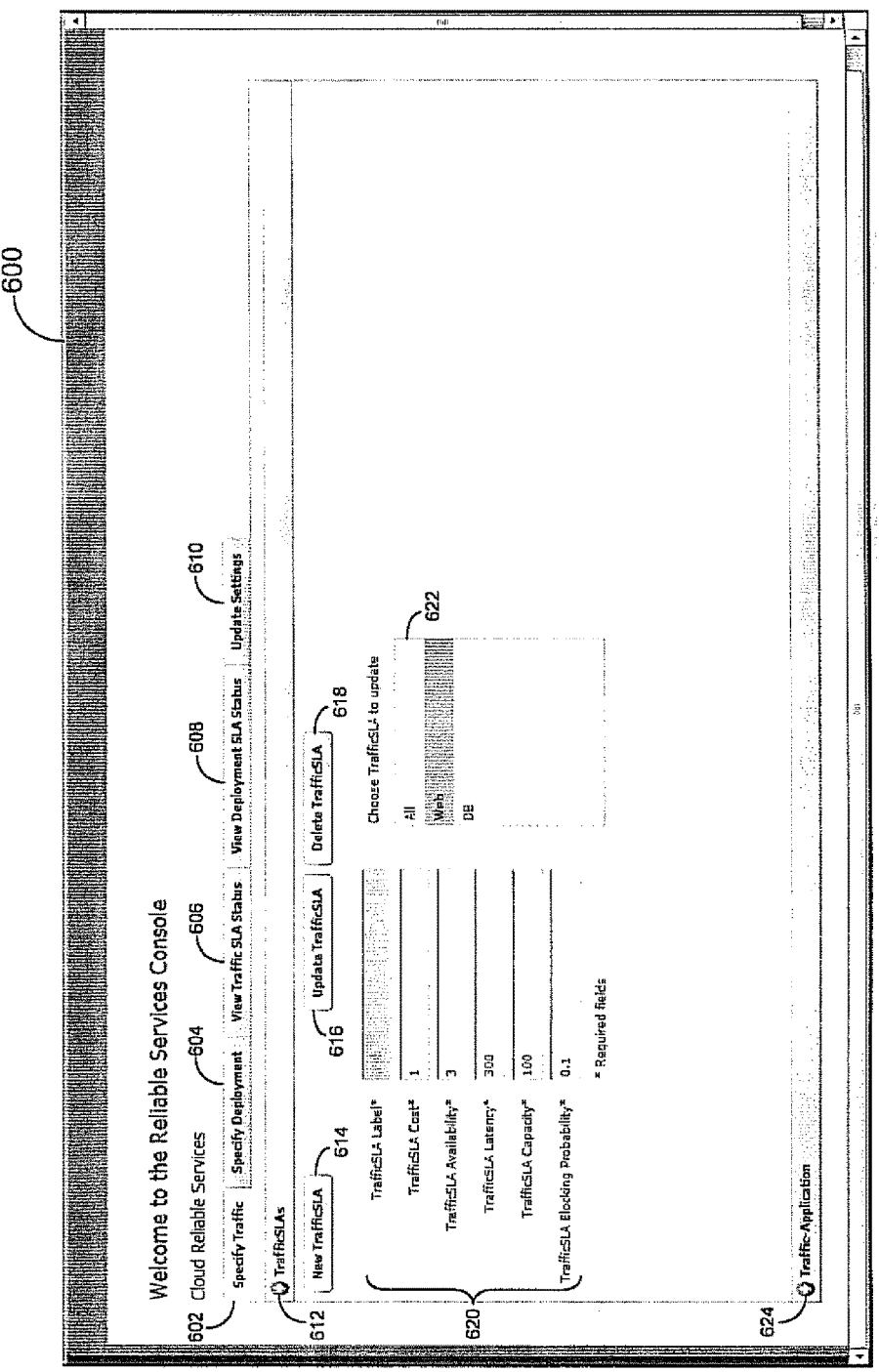
FIG. 6 is a user interface for configuring a cloud control layer in accordance with various embodiments of the disclosure.

FIG. 6 is a user interface 600 for configuring the control layer 604 in accordance with various embodiments of the disclosure. It is understood that a user can utilize the user interface 600 to input user specified bespoke (or indicated or requested) service level agreements (SLAs). Specifically, within the user interface 600 of FIG. 6, the user can specify a series of desired service level agreements for a selected application. In one embodiment the user interface 600 can be implemented as a graphical user interface (GUI), but is not limited to such.

In one embodiment, the user interface 600 can be implemented to include multiple tabs. For example within the present embodiment, the user interface 600 can include a "Specify Traffic" tab 602, a "Specify Deployment" tab 604, a "View Traffic SLA Status" tab 606, a "View Deployment SLA Status" tab 608, and an "Update Settings" tab 610, but is not limited such. Note that the "Specify Traffic" tab 602 is shown selected within the user interface 600. In addition, the example contents of the "Specify Traffic" tab 602 can include, but is not limited to, a "TrafficSLAs" sub-tab 612 and a "Traffic-Application" sub-tab 624. It is noted that the "TrafficSLAs" sub-tab 612 is shown selected and its example contents can include, but is not limited to, a "New TrafficSLA" activation button 614, an "Update TrafficSLA" activation button 616, and a "Delete TrafficSLA" activation button 618.

Within FIG. 6, when a user selects the "Update Traffic-SLA" activation button 616, the "Choose TrafficSLA to update" selection area 622 can be displayed thereby enabling the user to select the application he or she desires to update and/or view. For example, within the present embodiment of the "Choose TrafficSLA to update" selection area 622, the user can select to update the service level agreements of "All" the applications, the "Web" application, or a "DB" application. Once an application is selected within the "Choose TrafficSLA to update" selection area 622, one or more service level agreements can be displayed which can enable the user to update the one or more displayed service level agreements. For example within the present embodiment, when the Web application is selected within the "Choose TrafficSLA to update" selection area 622 as indicated by the highlighting of the word "Web", one or more service level agreement fields 620 can be displayed. Specifically, the one or more service level agreement fields 620 can include, but are not limited to, a label, a cost, an availability, a latency, a capacity, and/or a blocking probability associated with the selected application or applications of the "Choose TrafficSLA to update" selection area 622.

Note that the user interface 600 may not include all of the elements illustrated by FIG. 6. Additionally, the user interface 600 can be implemented to include one or more elements not illustrated by FIG. 6. It is pointed out that the user interface 600 of FIG. 6 can be utilized or implemented in any manner similar to that described herein, but is not limited to such.

Figure 7:
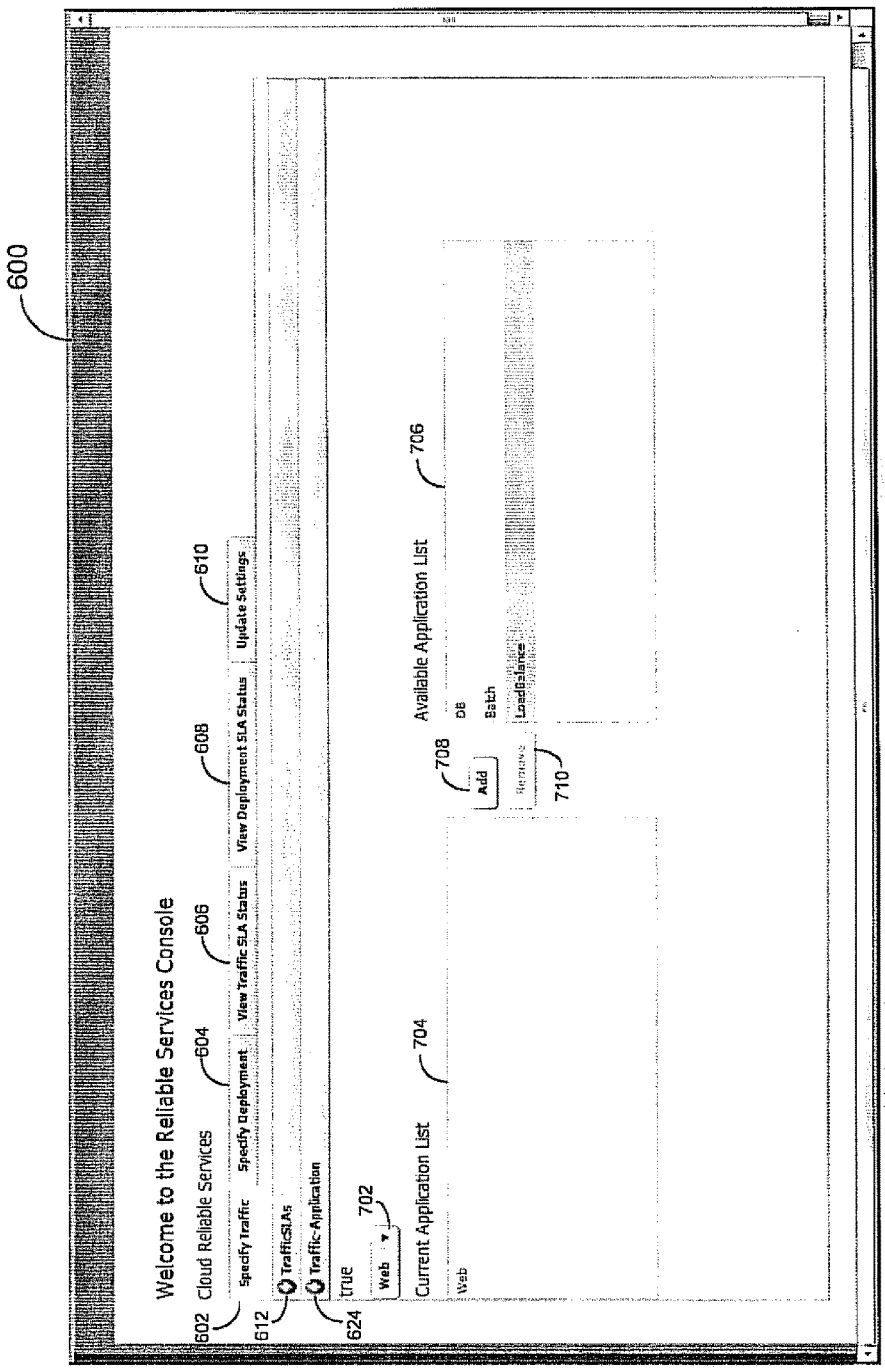
FIG. 7 illustrates both the "Specify Traffic" tab and the "Traffic-Application" sub tab selected within the user interface in accordance with various embodiments of the disclosure.

FIG. 7 illustrates both the "Specify Traffic" tab 602 and the "Traffic-Application" sub-tab 624 selected within the user interface 600 in accordance with various embodiments of the disclosure. It is pointed out that the contents of the Traffic-Application sub-tab 624 can be utilized by a user to associate specific roles with a specified application.

Within the present embodiment, the example contents of the Traffic-Application sub-tab 624 can include, but is not limited to, a role identifier drop-down menu selector 702, a "Current Application List" display area 704, an "Available Application List" display area 706, an "Add" activation button 708, and a "Remove" activation button 710. It is pointed out that the role identifier drop-down menu selector 702 can be utilized by a user to assign or associate one or more selected roles to a particular application. For instance within the present embodiment, the Web application listed within the Current Application List display area 704 currently has a web role as indicated by the role identifier drop-down menu selector 702.

Within FIG. 7, it is pointed out that if the Add activation button 708 is selected by a user while the LoadBalance application is highlighted as shown within the Available Application List display area 706, the LoadBalance application will be associated or assigned a web role while its label (or name or identifier) will be added to the Current Application List display area 704. Note that the Remove activation button 710 can be utilized by a user to remove and disassociate an application identifier from the Current Application List display area 704. For example in an embodiment, after a user selects or highlights the identifier of an application listed within the Current Application List display area 704, the Remove activation button 710 is displayed active and usable while the Add activation button 708 is displayed inactive and unusable. Thereafter, the user can select the Remove activation button 710 resulting in the highlighted application identifier being removed from the Current Application List display area 704. In addition, the removed application is disassociated or unassigned from its web role.

Figure 8:
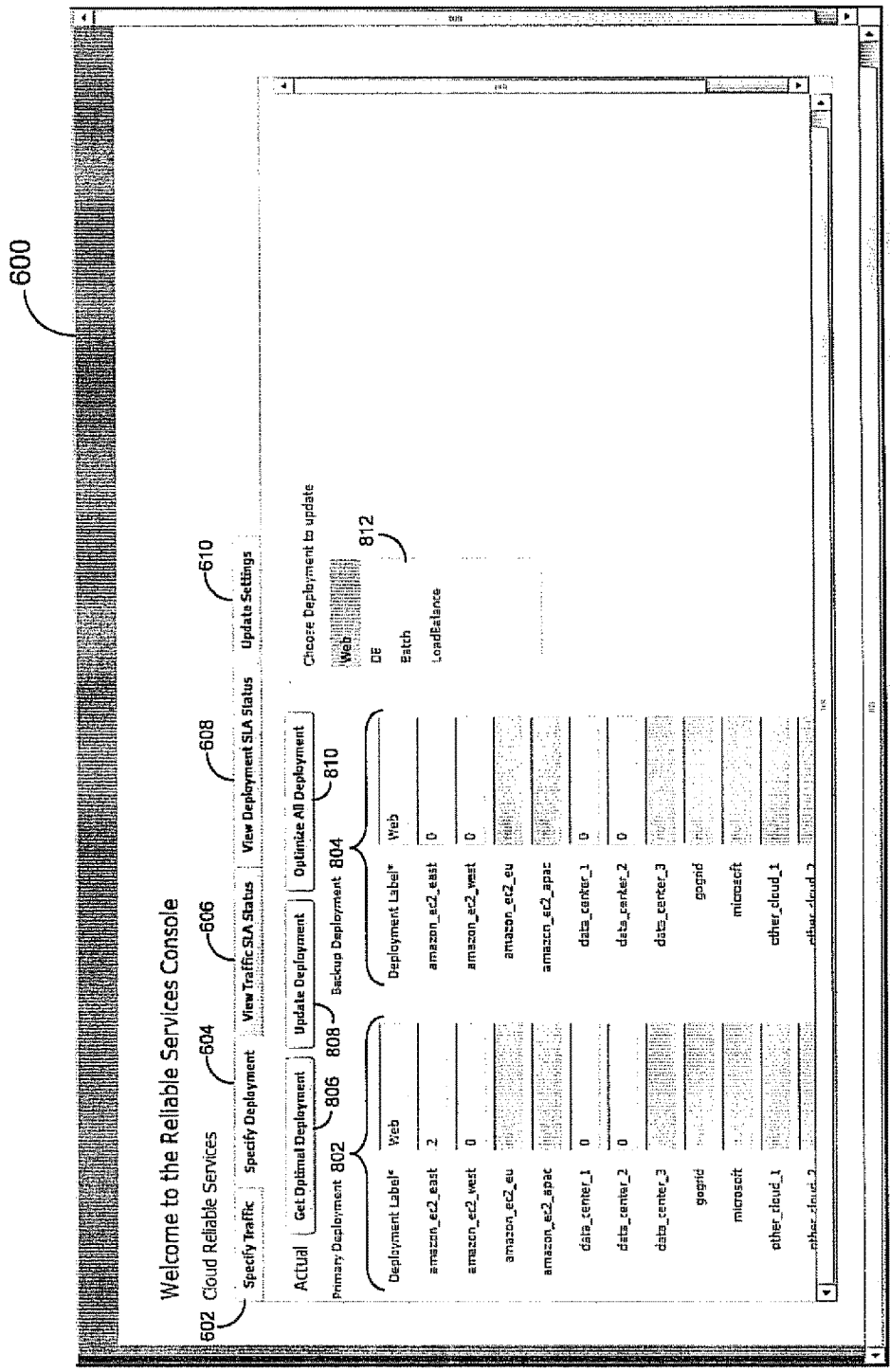
FIG. 8 illustrates the "Specify Deployment" tab selected within the user interface in accordance with various embodiments of the disclosure.

FIG. 8 illustrates the "Specify Deployment" tab 604 selected within the user interface 600 in accordance with various embodiments of the disclosure. The contents of the Specify Deployment tab 604 can be utilized by a user to view and specify the primary deployment and backup deployment associated with one or more applications.

Within the present embodiment, the example contents of the Specify Deployment tab 604 can include, but is not limited to, a "Get Optimal Deployment" activation button 806, an "Update Deployment" activation button 808, an "Optimize All Deployment" activation button 810, a "Primary Deployment" information fields 802, a "Backup Deployment" information fields 804, and a "Choose Deployment to update" selection area 812. Note that the "Get Optimal Deployment" activation button 806 can also be referred to as the "Get Best Possible Deployment" activation button 806 or the "Get Appropriate Deployment" activation button 806, but is not limited to such. Furthermore, the "Optimize All Deployment" activation button 810 can also be referred to as the "Enhance Effectiveness of All Deployment" activation button 810 or "Get Appropriate Deployment for All" activation button 810, but is not limited to such. It is pointed out that when the Update Deployment activation button 808 is selected by a user, the user interface 600 displays the "Choose Deployment to update" selection area 812 along with the Primary Deployment information fields 802 and Backup Deployment information fields 804 that correspond to the highlighted application within the "Choose Deployment to update" selection area 812.

Within FIG. 8, note that the "Choose Deployment to update" selection area 812 can be utilized by a user to select a particular application to update and/or view its corresponding primary deployment and backup deployment. For example within the present embodiment, the Web application label is highlighted or selected within the "Choose Deployment to update" selection area 812 thereby resulting in the display of its corresponding Primary Deployment information fields 802 and Backup Deployment information fields 804. It is noted that the grayed out provider fields shown within the Primary Deployment information fields 802 and the Backup Deployment information fields 804 have been filtered out by the control layer 604.

It is pointed out that if the Optimize All Deployment activation button 810 is selected by a user, the user interface 600 applies the optimum (e.g., minimum cost) or best possible or appropriate deployment that satisfies the service level agreements. Additionally, if the Get Optimal Deployment activation button 806 is selected by a user, the user interface 600 determines and highlights the application listed within the "Choose Deployment to update" selection area 812 that currently has the optimal (e.g., minimum cost) or best possible or appropriate deployment.

Figure 9:
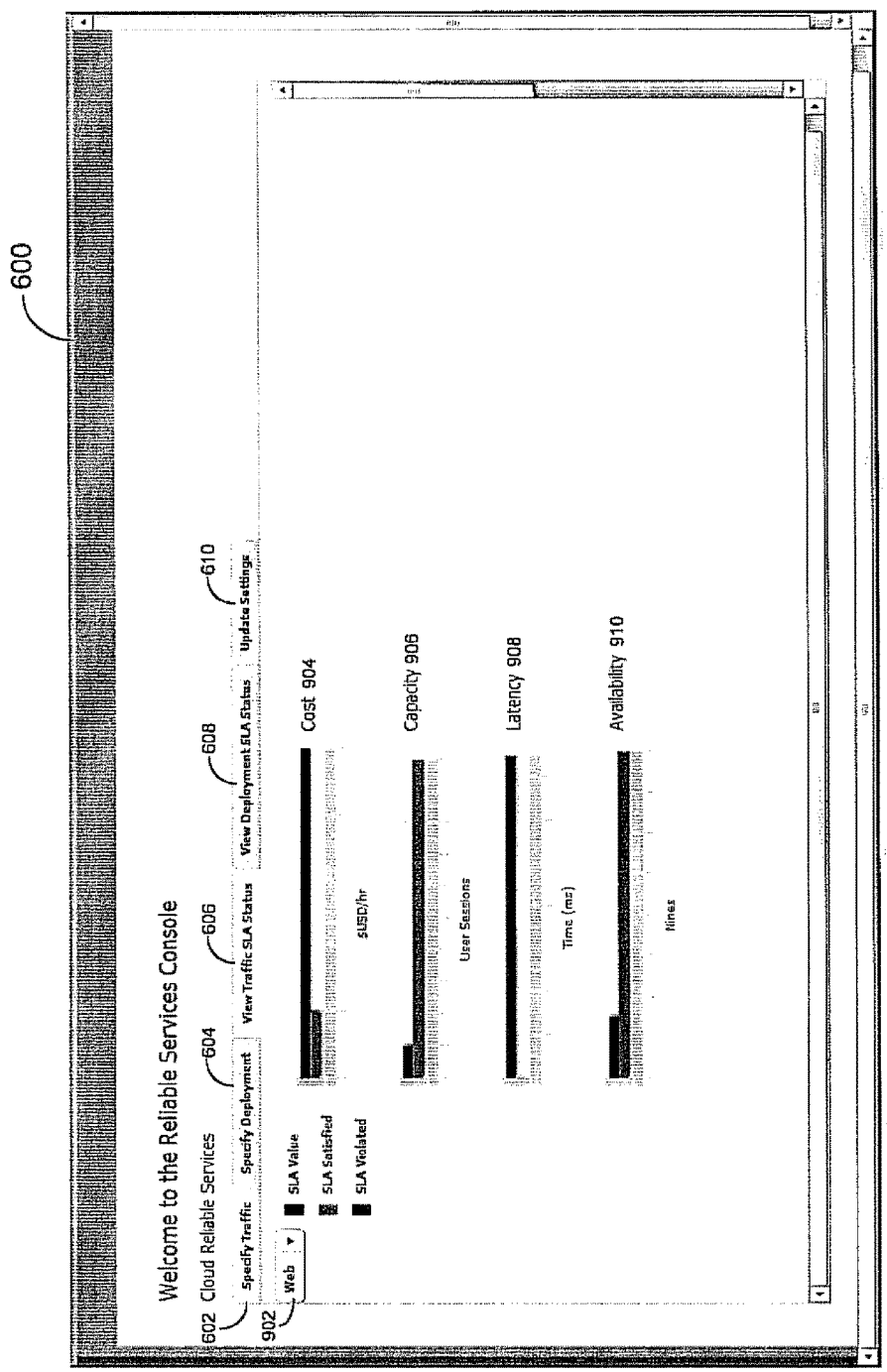
FIG. 9 illustrates the "View Traffic SLA Status" tab selected within the user interface in accordance with various embodiments of the disclosure.

FIG. 9 illustrates the "View Traffic SLA Status" tab 606 selected within the user interface 600 in accordance with various embodiments of the disclosure. The contents of the "View Traffic SLA Status" tab 606 can be utilized by a user to view composite application service level agreements (SLAs) that include the actual (or measured) application service level agreements (based on deployed) along with the user specified application service level applications.

Within the present embodiment, the example contents of the "View Traffic SLA Status" tab 606 can include, but is not limited to, an application identifier drop-down menu selector 902, a Cost graph 904, a Capacity graph 906, a Latency graph 908, and an Availability graph 910. It is noted that the application identifier drop-down menu selector 902 can be utilized by a user to select which composite application service level agreements to view. For example within the present embodiment, the "Web" application is currently selected within the application identifier drop-down menu selector 902. As such, the Cost graph 904, Capacity graph 906, Latency graph 908, and Availability graph 910 display the composite service level agreements for the Web application.

Specifically within FIG. 9, it is pointed out that the black bar shown within each of the Cost graph 904, Capacity graph 906, Latency graph 908, and Availability graph 910 represents the user defined application service level agreement value while the gray bar within each graph represents the actual or measured service level agreements based on deployed cloud components. More specifically, the X-axis of the Cost graph 904 represents the United States Dollars (USD) per hour (hr) service level agreement while the X-axis of the Capacity graph 906 represents the capacity for user sessions service level agreement. Furthermore, the X-axis of the Latency graph 908 represents the latency in milliseconds (ms) service level agreement while the X-axis of the Availability graph 910 represents the percent of time the application is available (e.g., 99.999% of the time) service level agreement.

Figure 10:
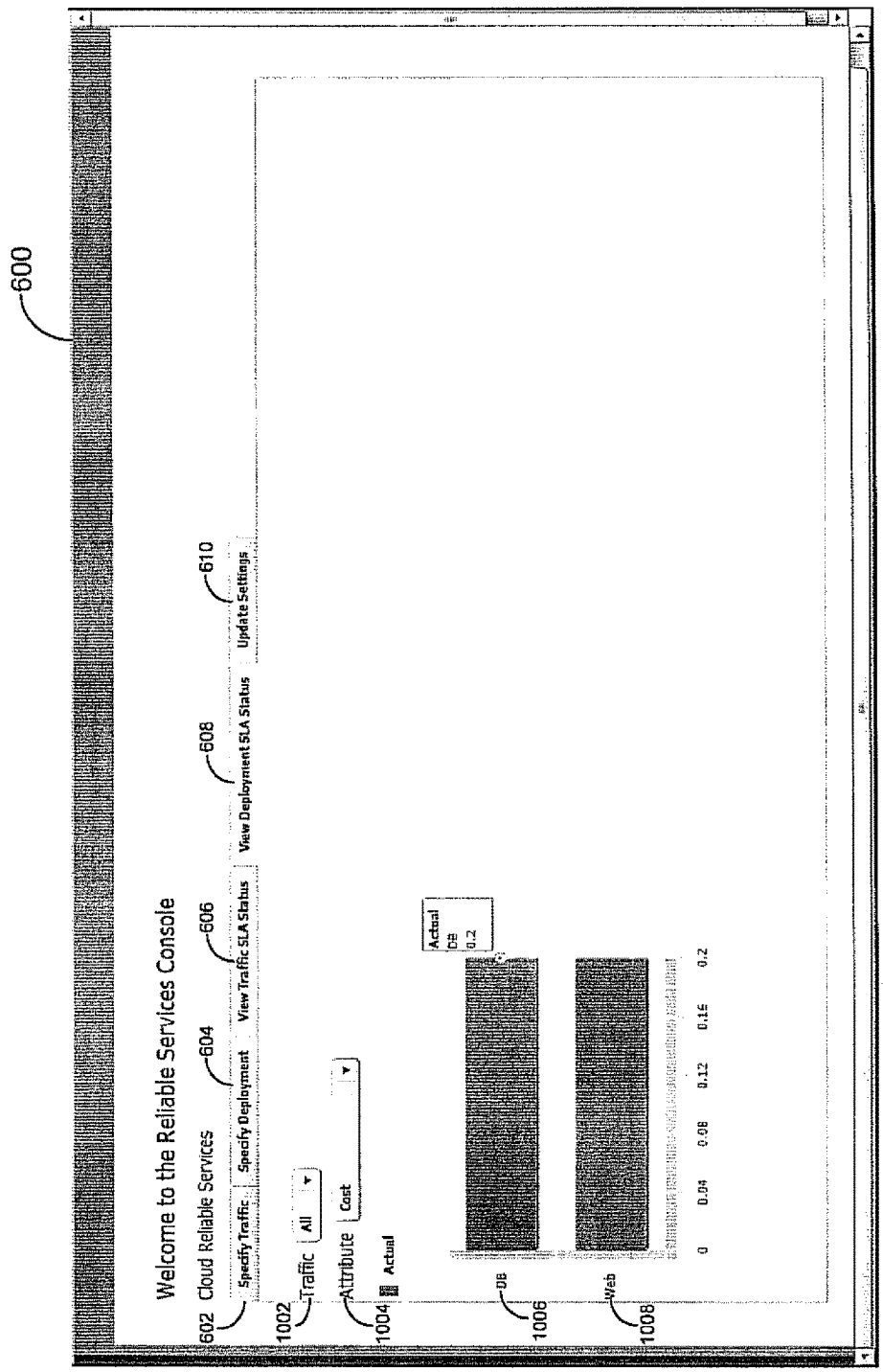
FIG. 10 illustrates the "View Deployment SLA Status" tab selected within the user interface in accordance with various embodiments of the disclosure.

FIG. 10 illustrates the "View Deployment SLA Status" tab 608 selected within the user interface 600 in accordance with various embodiments of the disclosure. The contents of the "View Deployment SLA Status" tab 608 can be utilized by a user to view how a specific application service level agreement (SLA) can be split or divided up by role.

Within the present embodiment, the example contents of the "View Deployment SLA Status" tab 608 can include, but is not limited to, an application identifier drop-down menu selector 1002, a service level agreement attribute drop-down menu selector 1004, a first role graph 1006, and a second role graph 1008. Note that the application identifier drop-down menu selector 1002 can be utilized by a user to select which application service level agreements to view. In addition, the service level agreement attribute drop-down menu selector 1004 can be utilized by the user to select which service level agreement attribute to view of the selected application.

Within the present embodiment of FIG. 10, it is pointed out that the "All" application is currently selected with the application identifier drop-down menu selector 1002. Furthermore, the service level agreement attribute drop-down menu selector 1004 is currently selected to the "Cost" attribute. Given the above user selections within the present embodiment, the user interface 600 displays the "DB" role graph 1006 and the "Web" role graph 1008 which illustrate that the cost of the "All" application is split between the "DB" role and the "Web" role.

Figure 11:
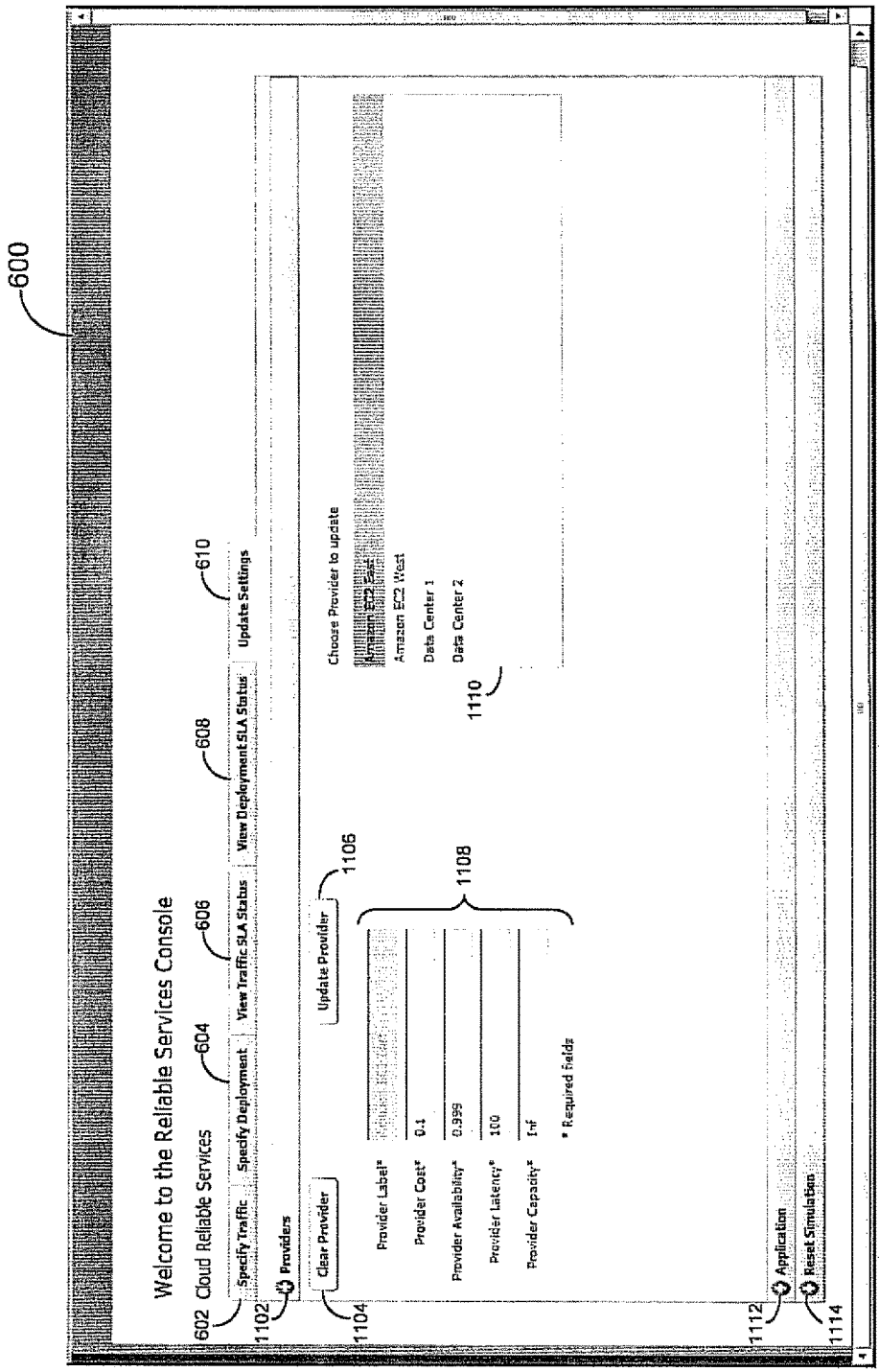
FIG. 11 illustrates the "Update Settings" tab selected within the user interface in accordance with various embodiments of the disclosure.

FIG. 11 illustrates the "Update Settings" tab 610 selected within the user interface 600 in accordance with various embodiments of the disclosure. Note that the contents of the "Update Settings" tab 610 can be utilized by a user to update and view one or more settings associated with one or more cloud providers, one or more applications, and resetting a simulation, but is not limited to such.

Specifically within the present embodiment, the contents of the "Update Settings" tab 610 includes, but is not limited to, a "Providers" sub-tab 1102, an "Application" sub-tab 1112, and a "Reset Simulation" sub-tab 1114. It is noted that the "Providers" sub-tab 1102 is shown selected thereby enabling a user to update and view one or more settings associated with one or more cloud providers. The example contents of the "Providers" sub-tab 1102 can include, but is not limited to, a "Clear Provider" activation button 1104, an "Update Provider" activation button 1106, a "Choose Provider to update" selection area 1110, and Cloud Provider information fields 1108.

Within FIG. 11, it is pointed out that when the "Update Provider" activation button 1106 is selected by a user, the user interface 600 can display the "Choose Provider to update" selection area 1110 along with one or more Cloud Provider information fields 1108 that correspond to the highlighted or selected provider within the "Choose Provider to update" selection area 1110. In one embodiment, the Cloud Provider information fields 1108 can include, but are not limited to, a provider label field, a provider cost field, a provider availability field, a provider latency field, and a provider capacity field. It is noted that the metrics of a provider shown within the Cloud Provider information fields 1108 can be obtained either via estimated values from actual measurements of the provider or from published (or known) values, but is not limited to such.

Figure 12:
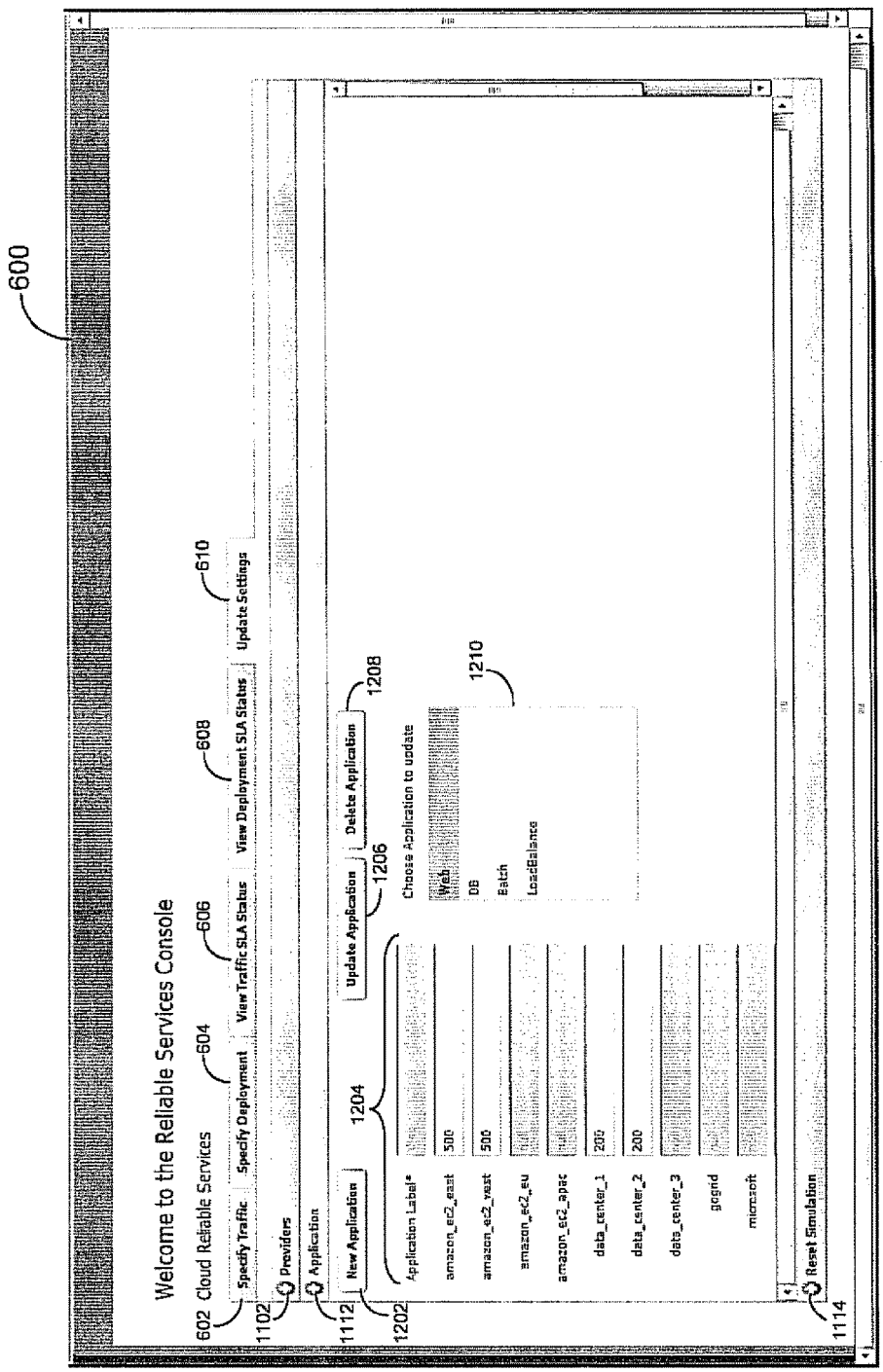
FIG. 12 illustrates both the "Update Settings" tab and the "Application" sub-tab selected within the user interface in accordance with various embodiments of the disclosure.

FIG. 12 illustrates both the "Update Settings" tab 610 and the "Application" sub-tab 1112 selected within the user interface 600 in accordance with various embodiments of the disclosure. It is pointed out that the contents of the "Application" sub-tab 1112 can be utilized by a user to update and view one or more settings of a specified cloud application, delete an existing cloud application, and add a new cloud application along with its corresponding settings, but is not limited to such.

Within the present embodiment, the example contents of the "Application" sub-tab 1112 can include, but is not limited to, a "New Application" activation button 1202, an "Update Application" activation button 1206, and a "Delete Application" activation button 1208. Note that when a user selects the "Update Application" activation button 1206, a "Choose Application to update" selection area 1210 can be displayed thereby enabling the user to select the application settings he or she desires to update and/or view. For example, within the present embodiment of the "Choose Application to update" selection area 1210, the user can to update the settings of the "Web" application, the "DB" application, a "Batch" application, or a "LoadBalance" application. Once an application is selected within the "Choose Application to update" selection area 1210, one or more application provider capacity fields 1204 can be displayed thereby enabling the user to view and/or update one or more of them. R is noted that the capacity of a provider may be updated utilizing either estimated values from actual measurements of the provider or from published (or known) values, but is not limited to such.

Specifically within the present embodiment of FIG. 12, when the "Web" application is selected within the "Choose Application to update" selection area 1210 as indicated by the highlighting of the word "Web", one or more provider capacity fields 1204 corresponding to the "Web" application can be displayed by the user interface 600. For example in one embodiment, the "Web" application has a capacity of 500 sessions for the "amazon_ec2_east" provider, a capacity of 500 sessions for the "amazon_ec2_wast" provider, a capacity of 200 sessions for the "data_center_1" provider, and a capacity of 200 sessions for the "data_center_2" provider. It is pointed out that the grayed out provider fields shown within the provider capacity fields 1204 have been filtered out by the control layer 104.

Note that the user interface 600 may not include all of the elements illustrated by FIGS. 6-12. Moreover, the user interface 600 can be implemented to include one or more elements not illustrated by FIGS. 6-12. It is pointed out that the user interface 600 of FIGS. 6-12 can be utilized or implemented in any manner similar to that described herein, but is not limited to such.

Figure 13:
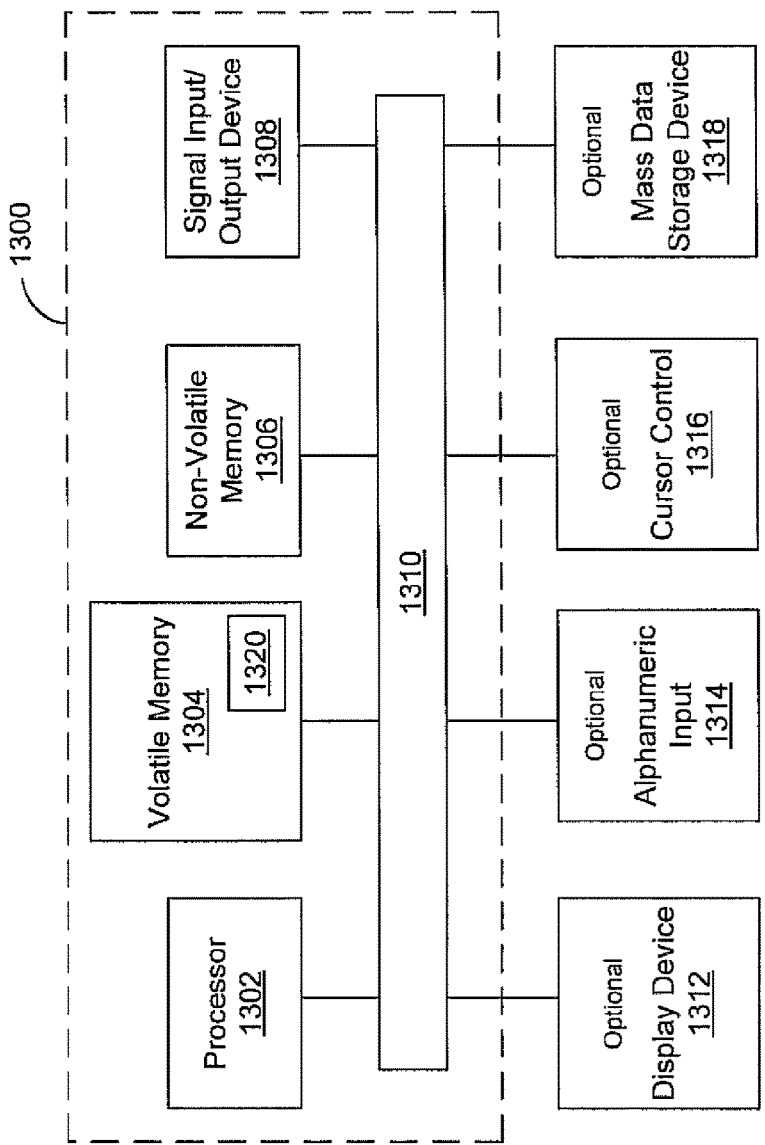
FIG. 13 is a block diagram of an exemplary computing system that may be used in accordance with various embodiments of the disclosure.

FIG. 13 is a block diagram of an exemplary computing system 1300 that may be used in accordance with various embodiments of the disclosure. It is understood that system 1300 is not strictly limited to be a computing system. As such, system 1300 is well suited to be any type of computing device (e.g., server, desktop computer, laptop computer, portable computing device, database computer system, handheld computing device, etc.) in accordance with various embodiments of the disclosure. In its various implementations, system 1300 may not include all of the elements illustrated by FIG. 13, or system 1300 may include other elements not shown by FIG. 13. Within discussions of various embodiments in accordance with the disclosure herein, certain processes and operations are discussed that can be realized, in some embodiments, as a series of instructions (e.g., software program, modules, and the like) that reside within computer readable memory or storage of computing system 1300 and executed by a processor(s) of system 1300. When executed, the instructions can cause computer 1300 to perform specific operations and exhibit specific behavior which are described herein, but are not limited to such.

Computer system 1300 can include an address/data bus 1310 for communicating information, one or more central processors 1302 coupled with bus 1310 for processing information and instructions. Central processor unit(s) 1302 may be a microprocessor or any other type of processor. The computer 1300 can also include data storage features such as computer usable volatile memory 1304, e.g., random access memory (RAM), static RAM, dynamic RAM, etc., coupled with bus 1310 for storing information and instructions for central processor(s) 1302, computer usable non-volatile memory 1306, e.g., read only memory (ROM), programmable ROM, flash memory, erasable programmable read only memory (EPROM), electrically erasable programmable read only memory (EEPROM), etc., coupled with bus 1310 for storing static information and instructions for processors) 1302.

System 1300 of FIG. 13 can also include one or more signal generating and receiving devices 1308 coupled with bus 1310 for enabling system 1300 to interface with other electronic devices. The communication interface(s) 1308 of the present embodiment may include wired and/or wireless communication technologies. For example in one embodiment, the communication interface 1308 is a serial communication port, but could also alternatively be any of a number of well-known communication standards and protocols, e.g., a Universal Serial Bus (USB), an Ethernet adapter, a FireWire (IEEE 1394) interface, a parallel port, a small computer system interface (SCSI) bus interface, an infrared (IR) communication port, a Bluetooth wireless communication adapter, a broadband connection, and the like. In an embodiment, a cable or digital subscriber line (DSL) connection may be employed. In such a case the communication interface(s) 1308 may include a cable modem or a DSL modem.

Optionally, computer system 1300 can include an alphanumeric input device 1314 including alphanumeric and function keys coupled to the bus 1310 for communicating information and command selections to the central processor(s) 1302. The computer 1300 can also include an optional cursor control or cursor directing device 1316 coupled to the bus 1310 for communicating user input information and command selections to the processor(s) 1302. The cursor directing device 1316 can be implemented using a number of well-known devices such as, but not limited to, a mouse, a track ball, a track pad, an optical tracking device, a touch screen, etc. Alternatively, it is appreciated that a cursor can be directed and/or activated via input from the alphanumeric input device 1314 using special keys and key sequence commands. The present embodiment is also well suited to directing a cursor by other means such as, for example, voice commands.

Within FIG. 13, the system 1300 can also include an optional computer sable mass data storage device 1318 such as a magnetic or optical disk and disk drive (e.g., hard drive or floppy diskette) coupled with bus 1310 for storing information and instructions. The system 1300 can include an optional display device 1312 coupled to bus 1310 for displaying video and/or graphics. Note that the optional display device 1312 may be implemented with different technologies. For example, the optional display device 1312 may be implemented with, but is not limited to, a cathode ray tube (CRT), flat panel liquid crystal display (LCD), field emission display (FED), plasma display, light emitting diode (LED) display, or any other display device suitable for displaying video and/or graphic images and alphanumeric characters recognizable to a user.

Note that the volatile memory 1304 may store a cloud management system or module 1320 in accordance with various embodiments of the disclosure. The cloud management system or module 1320 may include instructions to cause the system 1300 to operate or function in any manner similar to that described herein, but not limited to such. It is pointed out that in various embodiments, the cloud management system or module 1320 (or one or more of its components) may be stored by the volatile memory 1304, or the non-volatile memory 1306, or the mass data storage device 1318, or any combination thereof. In various embodiments, the cloud management system or module 1320 can be an implementation of the cloud management system or module 100 of FIG. 1 or the cloud management system or module 200 of FIG. 2, but is not limited to such.

Within FIG. 13, it is noted that the components associated with system 1300 described above may be resident to and associated with one physical computing device. However, one or more of the components associated with system 1300 may be physically distributed to other locations and be communicatively coupled together (e.g., via one or more networks).

Note that the system 1300 may not include all of the elements illustrated by FIG. 13. Furthermore, the system 1300 can be implemented to include one or more elements not illustrated by FIG. 13. It is pointed out that the system 1300 can be utilized or implemented in any manner similar to that described herein, but is not limited to such.

The foregoing descriptions of various specific embodiments in accordance with the disclosure have been presented for purposes of illustration and description. They are not intended to be exhaustive or to limit the disclosure to the precise forms disclosed, and many modifications and variations are possible in light of the above teaching.

What is claimed is:

1. A method comprising:
in a cloud computing configuration system, with cloud control circuitry:
determining to implement a cloud architecture by deploying instances of a workload component;
determining constraints applicable to the workload component;
determining capabilities of available cloud computing platforms hosted by different providers;
selecting deployment cloud computing platforms from among the available cloud computing platforms responsive to the constraints applicable to the workload component and the capabilities of the cloud computing platforms; and
with instantiation circuitry:
for each of the deployment cloud computing platforms that were selected, perform a respective sizing and sourcing determination based on information received from the respective deployment cloud computing platform of the deployment cloud computing platforms that were selected, the sizing and sourcing determination including an assignment of roles for the instances of the workload component;
based on the respective sizing and sourcing determinations, provisioning and configuring a workload distribution script, in accord with the assignment of roles, for deployment of the instances of the workload component, the workload distribution script configured to install a pre-defined image of the workload component; and
initiating the deployment of the instances of the workload component to the deployment cloud computing platforms, where multiple different providers host the deployment cloud computing platforms.

2. The method of claim 1, where:
the workload component comprises a software instance, and the deployment cloud computing platforms will execute the software instances.

3. The method of claim 1, further comprising:
providing configuration information to the deployment cloud computing platforms for executing the workload component.

4. The method of claim 1, where:
determining to implement the cloud architecture comprises:
determining to scale an existing cloud computing platform that comprises already-deployed instances of the workload component.

5. The method of claim 4, where:
determining to scale comprises:
obtaining a service level requirement from a configuration database; and
determining that the service level requirement does not meet a defined threshold with respect to the existing cloud computing platform.

6. The method of claim 5, further comprising:
identifying the workload component as a cause that the service level requirement does not meet the defined threshold.

7. The method of claim 1, further comprising:
determining that the workload component is horizontally scalable by performing common functionality in parallel across the deployment cloud computing platforms, responsive to a probability that the deployment cloud computing platforms are unable to meet a demand.

8. A system comprising:
control circuitry configured to:
determine to scale an existing cloud computing platform via deployment of instances of a workload component of the existing cloud computing platform;
determine constraints applicable to the workload component;
determine capabilities of available cloud computing platforms hosted by different providers;
analyze the constraints and the capabilities, and responsively select deployment cloud computing platforms from among the available cloud computing platforms; and
transformation circuitry configured to:
after selection of the deployment cloud computing platforms, obtain a transformed instance by transforming a first instance of the instances of the workload component responsive to a computing environment for a first deployment cloud computing platform of the deployment cloud computing platforms; and
instantiation circuitry configured to:
for each of the deployment cloud computing platforms that were selected, perform a respective sizing and sourcing determination based on information received from the respective deployment cloud computing platform of the deployment cloud computing platforms that were selected, the sizing and sourcing determination including an assignment of roles for the instances of the workload component;
based on the respective sizing and sourcing determinations, provision and configure a workload distribution script, in accord with the assignment of roles, for the deployment of the instances of the workload component, the workload distribution script configured to install a pre-defined image of the workload component; and
initiate the deployment of the instances of the workload component to the deployment cloud computing platforms by deploying the transformed instance to the first deployment cloud computing platform, the deployment cloud computing platforms characterized in that multiple different vendors provide the deployment cloud computing platforms.

9. The system of claim 8, where:
the instantiation circuitry is further configured to receive a workload assignment from the control circuitry that specifies the deployment cloud computing platforms.

10. The system of claim 8, where:
the control circuitry is further configured to filter the available cloud computing platforms to select the deployment cloud computing platforms.

11. The system of claim 10, where:
the control circuitry is configured to filter the available cloud computing platforming using a multiple parameter requirements filter.

12. The system of claim 11, where:
the multiple parameter requirements filter is responsive to:
compliance requirements for the available cloud computing platforms.

13. The system of claim 11, where:
the multiple parameter requirements filter is responsive to:
capability requirements for the available cloud computing platforms and the capabilities of the available cloud computing platforms.

14. The system of claim 8, where:
the control circuitry is further configured to:
obtain a service level requirement from a configuration database; and
determine that the service level requirement does not meet a defined threshold with respect to the existing cloud computing platform.

15. The system of claim 14, where:
the control circuitry is further configured to:
identify the workload component as a cause that the service level requirement does not meet the defined threshold.

16. The system of claim 8, where:
the control circuitry is further configured to determine that the workload component is horizontally scalable by performing common functionality in parallel across the deployment cloud computing platforms, responsive to a probability that the deployment cloud computing platforms are unable to meet a demand.

17. A system comprising:
control circuitry configured to:
obtain a performance constraint for an existing cloud computing platform;
determine whether the performance constraint meets a defined threshold;
when the performance constraint does not meet the defined threshold:
identify a computing component as a cause that the performance constraint does not meet the defined threshold;
determine to increase capacity for the existing cloud computing platform via deployment of instances of the computing component;
determine a constraint applicable to the computing component;
determine a capability of available cloud computing platforms hosted by different providers; and
analyze the constraint and the capability and responsively select deployment cloud computing platforms from among the available cloud computing platforms; and
transformation circuitry configured to:
after selection of the deployment cloud computing platforms, obtain a transformed instance by transforming a first instance of the instances of the computing component responsive to a computing environment for a first deployment cloud computing platform of the deployment cloud computing platforms; and
instantiation circuitry configured to:
receive a workload assignment from the control circuitry with regard to the deployment cloud computing platforms that were selected; and
for each of the deployment cloud computing platforms that were selected, perform a respective sizing and sourcing determination based on information received from the respective deployment cloud computing platform of the deployment cloud computing platforms that were selected, the sizing and sourcing determination including an assignment of roles for the instances of the computing component;
based on the respective sizing and sourcing determinations, provision and configure a computing distribution script, in accord with the assignment of roles, for the deployment of the instances of the computing component, the computing distribution script configured to install a pre-defined image of the computing component; and
initiate the deployment of the instances of the computing component to the deployment cloud computing platforms provided by multiple different vendors by deploying the transformed instance to the first deployment cloud computing platform.

18. The system of claim 17, where:
the performance constraint comprises event processing time.

19. The system of claim 17, where:
the performance constraint comprises completion of items to be processed within a batch job within a specified time allotment.

20. The system of claim 17, where:
the control circuitry is further configured to:
determine how many deployment cloud computing platforms to use for the deployment in order to bound session blocking probability to less than a specified probability.

* * * * *

UNITED STATES PATENT AND TRADEMARK OFFICE
CERTIFICATE OF CORRECTION

PATENT NO. : 10,069,907 B2
APPLICATION NO. : 14/938337
DATED : September 4, 2018
INVENTOR(S) : Teresa S. Tung et al.

Page 1 of 1

It is certified that error appears in the above-identified patent and that said Letters Patent is hereby corrected as shown below:

On the Title Page

Under (72) Inventors, please delete "Clarendon Hills, CA (US)" and in its place insert --Clarendon Hills, IL (US)--

Signed and Sealed this
Fifteenth Day of October, 2019

Andrei Iancu
*Director of the United States Patent and Trademark Office*